US012221830B2

(12) United States Patent
Flannery et al.

(10) Patent No.: US 12,221,830 B2
(45) Date of Patent: Feb. 11, 2025

(54) BARRIER WITH STRUCTURALLY DIFFERENT CORNER GATE CONNECTIONS

(71) Applicant: Regalo International, LLC, Burnsville, MN (US)

(72) Inventors: Mark A. Flannery, Longboat Key, FL (US); Matthew A. Willms, Woodbury, MN (US)

(73) Assignee: Regalo International, LLC, Longboat Key, FL (US)

( * ) Notice: Subject to any disclaimer, the term of this patent is extended or adjusted under 35 U.S.C. 154(b) by 0 days.

(21) Appl. No.: 18/372,127

(22) Filed: Sep. 24, 2023

(65) Prior Publication Data

US 2024/0011351 A1 Jan. 11, 2024

Related U.S. Application Data

(63) Continuation of application No. 17/958,393, filed on Oct. 1, 2022, now Pat. No. 11,767,711, which is a (Continued)

(51) Int. Cl.

| | |
|---|---|
| ***E06B 9/04*** | (2006.01) |
| ***E05B 65/00*** | (2006.01) |
| ***E05D 3/08*** | (2006.01) |
| ***E05D 7/10*** | (2006.01) |
| ***E06B 11/02*** | (2006.01) |

(Continued)

(52) U.S. Cl.

CPC ............ *E06B 9/04* (2013.01); *E05B 65/0007* (2013.01); *E05D 3/08* (2013.01); *E05D 7/1044* (2013.01); *E06B 11/026* (2013.01); *E06B 11/04* (2013.01); *E05B 17/2088* (2013.01); *E05C 1/10* (2013.01); *E06B 2009/002* (2013.01)

(58) Field of Classification Search

CPC .......... E06B 9/04; E06B 11/026; E06B 11/04; E06B 2009/002; E05B 65/0007; E05D 3/08; E05D 2007/0446; E05D 5/10; E05D 7/1044; E05C 1/10

See application file for complete search history.

(56) References Cited

U.S. PATENT DOCUMENTS 4,122,630 A 10/1978 Parisien
4,777,765 A 10/1988 Johnson, Jr.

(Continued)

FOREIGN PATENT DOCUMENTS

DE 102015113242 A1 2/2017

OTHER PUBLICATIONS

WIPO, Notification Concerning Transmittal of International Preliminary Report on Patentability dated Feb. 6, 2020 (one page) in PCT/US2018/043789, Geneva, Switzerland.

(Continued)

*Primary Examiner* — Justin B Rephann

(57) ABSTRACT

A barrier that includes four structurally different corner connections for fixing a gate frame of the barrier to and between opposing vertical surfaces. A first connection includes a headed straight pin engaging a pivot hook and socket, a second connection includes a headed straight pin engaging a socket, a third connection includes headless bent pin engaging a socket and a limiter, and a fourth connection includes a headless bent pin engaging a socket.

3 Claims, 16 Drawing Sheets

Related U.S. Application Data continuation of application No. 17/184,579, filed on Feb. 24, 2021, now Pat. No. 11,459,818, which is a continuation of application No. 16/040,509, filed on Jul. 19, 2018, now Pat. No. 10,934,768.

(60) Provisional application No. 62/537,441, filed on Jul. 26, 2017.

(51) Int. Cl.

| | |
|---|---|
| ***E06B 11/04*** | (2006.01) |
| *E05B 17/20* | (2006.01) |
| *E05C 1/10* | (2006.01) |
| *E06B 9/00* | (2006.01) |

(56) References Cited

U.S. PATENT DOCUMENTS

| | | | | |
|---|---|---|---|---|
| 5,718,414 | A | 2/1998 | Deloach | |
| 5,797,218 | A | 8/1998 | Holland | |
| 6,073,396 | A | 6/2000 | Kietzmann | |
| 6,112,460 | A | 9/2000 | Wagnitz | |
| 7,565,769 | B2 | 7/2009 | Monahan et al. | |
| 7,874,103 | B2 | 1/2011 | Yates | |
| 8,375,517 | B1 | 2/2013 | Johnsen | |
| 8,413,300 | B1 | 4/2013 | Luneborg | |
| 8,607,502 | B2 * | 12/2013 | Flannery | E05B 17/2038 49/55 |
| 8,713,851 | B2 | 5/2014 | Flannery et al. | |
| 9,151,108 | B1 | 10/2015 | Flannery et al. | |
| 9,366,075 | B2 | 6/2016 | Marsden | |
| 9,382,740 | B2 * | 7/2016 | Flannery | E05D 7/10 |
| 9,382,750 | B1 * | 7/2016 | Flannery | E05D 15/54 |
| 9,394,726 | B1 | 7/2016 | Flannery et al. | |
| 9,637,959 | B2 | 5/2017 | Marsden et al. | |
| 9,874,056 | B1 | 1/2018 | Flannery et al. | |
| 9,982,479 | B1 | 5/2018 | Flannery et al. | |
| 10,024,080 | B2 | 7/2018 | Marsden | |
| 10,550,634 | B1 | 2/2020 | Holland | |
| 10,683,699 | B2 | 6/2020 | Wang | |
| 10,907,382 | B2 | 2/2021 | Raffi | |
| 11,015,386 | B2 | 5/2021 | Wang | |
| 11,118,398 | B2 | 9/2021 | Kaiser | |
| 11,512,527 | B1 | 11/2022 | Flannery | |
| 2004/0045222 | A1 | 3/2004 | Hicks | |
| 2005/0120517 | A1 | 6/2005 | Bonham | |
| 2005/0183238 | A1 | 8/2005 | McCue | |
| 2006/0207180 | A1 | 9/2006 | Cheng | |
| 2007/0131921 | A1 | 6/2007 | Monahan | |
| 2008/0110413 | A1 | 5/2008 | Kobayashi | |
| 2009/0013606 | A1 | 1/2009 | Yates | |
| 2010/0290830 | A1 | 11/2010 | Cheng | |
| 2011/0175046 | A1 * | 7/2011 | Flannery | E06B 9/02 403/396 |
| 2012/0090136 | A1 | 4/2012 | Fields | |
| 2014/0007506 | A1 | 1/2014 | Huang | |
| 2015/0089873 | A1 | 4/2015 | Marsden et al. | |
| 2015/0101253 | A1 | 4/2015 | Marsden | |
| 2017/0058595 | A1 | 3/2017 | Marsden | |
| 2017/0211314 | A1 | 7/2017 | Raffi | |
| 2018/0148954 | A1 * | 5/2018 | Raffi | E05B 59/00 |
| 2021/0079700 | A1 | 3/2021 | Wang | |

OTHER PUBLICATIONS

WIPO, International Preliminary Report on Patentability of Jan. 28, 2020 (11 pages) in PCT/US2018/043789, Geneva, Switzerland.

ISA/US, Notification of Transmittal of the International Search Report and the Written Opinion of the International Searching Authority, or the Declaration, Oct. 3, 2018, PCT/US2018/043789, ISA/US, Alexandria, Virginia, United States of America.

ISA/US, International Search Report, Oct. 3, 2018, PCT/US2018/043789, ISA/US, Alexandria, Virginia, United States of America.

ISA/US, Written Opinion of the International Searching Authority, Oct. 3, 2018, PCT/US2018/043789, ISA/US, Alexandria, Virginia, United States of America.

* cited by examiner

FIG. 11C
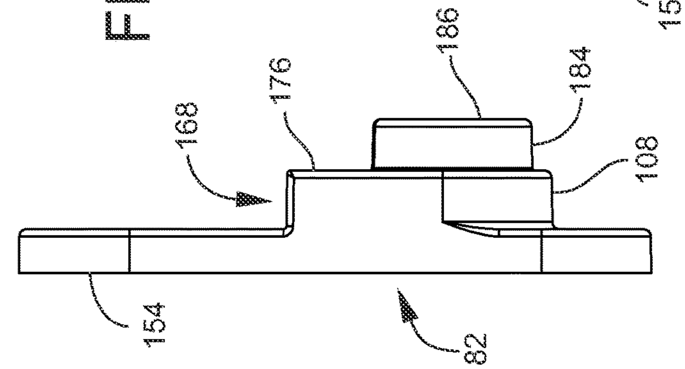
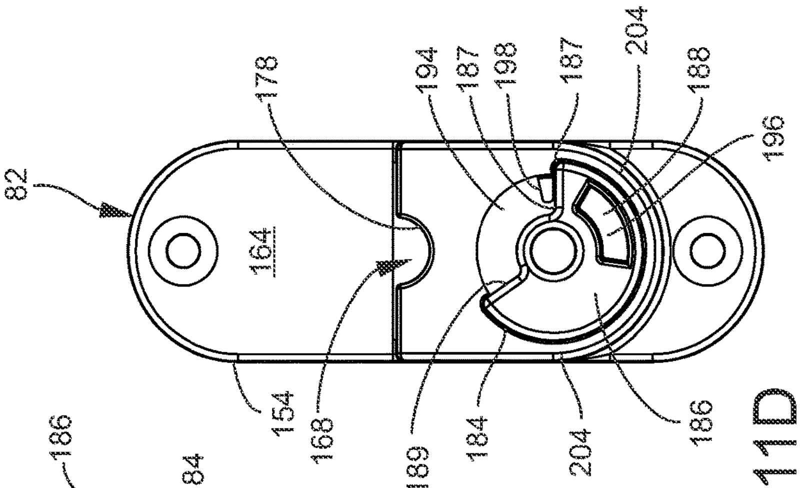
FIG. 11D
FIG. 11A
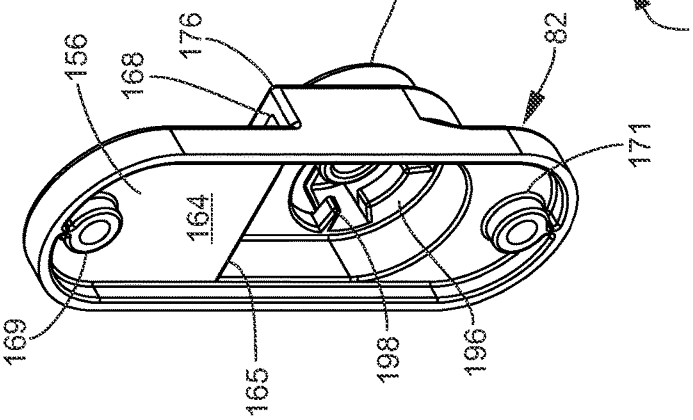
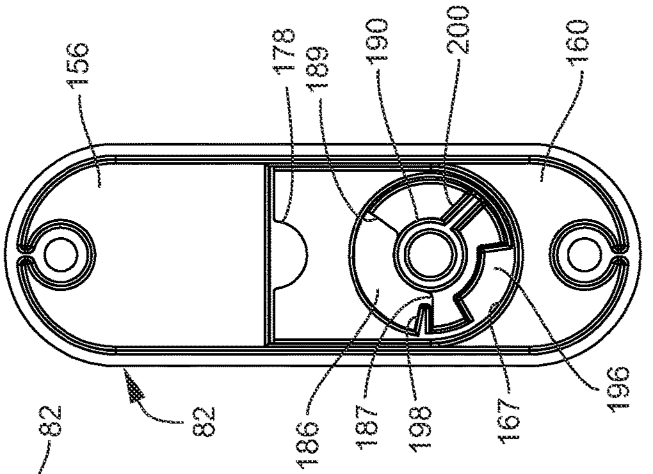
FIG. 11B

BARRIER WITH STRUCTURALLY DIFFERENT CORNER GATE CONNECTIONS

This application is a continuation of U.S. patent application Ser. No. 17/958,393 filed Oct. 1, 2022 (U.S. Pat. No. 11,767,711 issued Sep. 26, 2023) and claims the benefit thereof under 35 U.S.C. § 120, which application is a continuation of U.S. patent application Ser. No. 17/184,579 filed Feb. 24, 2021 (U.S. Pat. No. 11,459,818 issued Oct. 4, 2022) and claims the benefit thereof under 35 U.S.C. § 120, which application is a continuation of U.S. patent application Ser. No. 16/040,509 filed Jul. 19, 2018 (U.S. Pat. No. 10,934,768 issued Mar. 2, 2021) and claims the benefit thereof under 35 U.S.C. § 120, which application claims the benefit under 35 U.S.C. 119(e) of U.S. Provisional Patent Application No. 62/537,441 filed Jul. 26, 2017, with all of such applications being hereby incorporated by reference in their entireties into this application.

FIELD OF THE INVENTION

The present invention relates to a barrier having a gate, and more particularly to a barrier having a gate that swings only one way and includes corner bases that are relatively permanently affixed to and between opposing structures while permitting the gate as a whole to be removed if desired from the relatively permanent bases.

BACKGROUND OF THE INVENTION

A "top of stairs" gate may have a couple of features. First, such a gate is positioned at the top of a staircase. Second, such a gate is anchored to a door jamb, wall, or staircase portion such as a baluster or other permanent grounded structure. The types of anchors can be pins such as screws, brackets, straps, or other types of connectors that penetrate or wrap around a permanent grounded structure. Third, such a gate swings only one way. The way "the top of stairs" gate swings is away from the top of the staircase such that the gate does not swing over the staircase.

A pressure mounted gate is not utilized at the top of a staircase. A pressure mounted gate is a type of gate that has a frame that is manufactured to have an outward bias between frame portions. The biased frame portions may, for example, have hand wheels that press upon opposing vertical surfaces of a residence, such as vertical door jambs. The end user turns the hand wheels to push one or more of the frame portions from an oblique position to a right angle position such that the frame of the pressure mounted gate is effectively squeezed between the opposing vertical surfaces.

SUMMARY OF THE INVENTION

A feature of the present invention is the provision in a gated barrier for engagement between first and second surfaces, of a gate frame having a first gate frame portion and a second gate frame portion, where each of the first and second gate frame portions include upper and lower support members, where each of the first and second gate frame portions include traversing support members traversing a distance between the upper and lower support members to tie together the upper and lower support members.

Another feature of the present invention is the provision in such a gated barrier, of a first and upper connection including a first and upper base that is configured to be engaged to the first surface, where the first and upper connection engages the first gate frame portion.

Another feature of the present invention is the provision in such a gated barrier, of a second and lower connection including a second and lower base that is configured to be engaged to the first surface below the first and upper base, where the second and lower connection engages the first gate frame portion.

Another feature of the present invention is the provision in such a gated barrier, of a third and upper connection including a third and upper base that is configured to be engaged to the second surface, where the third and upper connection engages the second gate frame portion.

Another feature of the present invention is the provision in such a gated barrier, of a fourth and lower connection including a fourth and lower base that is configured to be engaged to the second surface below the third and upper base, where the fourth and lower connection engages the second gate frame portion.

Another feature of the present invention is the provision in such a gated barrier, of an intermediate connection fixing the first and second gate frame portions together to minimize lateral, longitudinal and height-wise movement of the first and second gate frame portions relative to each other, where the intermediate connection is engagable to and disengagable from the first and second gate frame portions without destroying the integrity of the first and second gate frame portions and the intermediate connection.

Another feature of the present invention is the provision in such a gated barrier, of the intermediate connection engaging a set of four traversing support members, where the intermediate connection includes a width equal to or slightly less than a lateral distance between outer side faces of upper support members of the first and second gate frame portions that are laterally aligned and abut each other such that the intermediate connection provides a lateral friction fit.

Another feature of the present invention is the provision in such a gated barrier, of the intermediate connection engaging a set of four traversing support members, where the intermediate connection includes a length equal to or slightly less than a longitudinal distance between two adjacent traversing support members of one of the first and second gate frame members such that the intermediate connection provides a longitudinal friction fit.

Another feature of the present invention is the provision in such a gated barrier, of a first traversing support member of the first gate frame portion being disposed in a common lateral plane with a first traversing support member of the second gate frame portion, where a second traversing support member of the second gate frame portion is disposed in a common lateral plane with a second traversing support member of the second gate frame portion, where the upper support members of the first and second gate frame portions are disposed in a common horizontal plane, and where the lower support members of the first and second gate frame portions are disposed in a common horizontal frame.

Another feature of the present invention is the provision in such a gated barrier, of the intermediate connection including an outer portion and an inner portion that resiliently engage to and disengage from each other.

Another feature of the present invention is the provision in such a gated barrier, of the intermediate connection enveloping laterally adjacent sections of the first and second gate frame portions, where such laterally adjacent sections are from one of a) the upper support members and b) the lower support members, where the intermediate connection runs to and between adjacent traversing support members of the first gate frame portion, and where the intermediate connection runs to and between adjacent traversing support members of the second gate frame portion.

Another feature of the present invention is the provision in a gated barrier for engagement between first and second surfaces, of a gate frame having upper and lower support members, and of the gate frame further having traversing support members traversing a distance between the upper and lower support members to tie together the upper and lower support members.

Another feature of the present invention is the provision in such a gated barrier, of a first and upper connection including a first and upper base that is configured to be engaged to the first surface, where the first and upper connection engages the gate frame, where the gate frame is liftable from the first and upper base.

Another feature of the present invention is the provision in such a gated barrier, of a second and lower connection including a second and lower base that is configured to be engaged to the first surface below the first and upper base, where the second and lower connection engages the gate frame, and where the gate frame is liftable from the second and lower base.

Another feature of the present invention is the provision in such a gated barrier, of a third and upper connection including a third and upper base that is configured to be engaged to the second surface, where the third and upper connection engages the gate frame, and where the gate frame is liftable from the third and upper base.

Another feature of the present invention is the provision in such a gated barrier, of a fourth and lower connection including a fourth and lower base that is configured to be engaged to the second surface below the third and upper base, where the fourth and lower connection engages the gate frame, and where the gate frame is liftable from the fourth and lower connection.

Another feature of the present invention is the provision in such a gated barrier, of the first and upper base of the first and upper connection including a socket and a pivot hook, where the socket and pivot hook are disposed longitudinally of each other, where the first and upper connection includes a pin having a head and a shaft, and where the head is engagable in the socket and the shaft is engagable by the pivot hook.

Another feature of the present invention is the provision in such a gated barrier, of the second and lower base of the second and lower connection including a socket, where the second and lower connection includes a pin having a head and a shaft, where the head is engagable in the socket and the shaft is incrementally engaged in a longitudinal manner to the gate frame such that the head of the pin can be incrementally adjusted to and away from the socket.

Another feature of the present invention is the provision in such a gated barrier, of the third and upper base of the third and upper connection including a socket and a limiter slideable in a direction towards and away from the socket, where the limiter includes first and second positions relative to the socket, where the third and upper connection includes a pin having first and second pin ends, where the first pin end is engagable in the socket, where the second pin end is engagable to the gate frame, where the first pin is liftable in the socket when the limiter is in either of the first and second positions, where the first pin is removable from the socket when the limiter is in the second position, and where the first pin is retained in the socket when the limiter is in the first position.

Another feature of the present invention is the provision in such a gated barrier, of the fourth and lower base of the fourth and lower connection including a socket, where the fourth and lower connection includes a pin having first and second pin end portions, where the first pin end portion is engagable in the socket and the second pin end portion is incrementally engaged in a longitudinal manner to the gate frame such that the first pin end portion of the pin can be incrementally adjusted to and away from the socket, and where the first pin end portion is disposed transversely relative to the second pin end portion.

Another feature of the present invention is the provision in such a gated barrier, of a gate frame having a first gate frame portion and a second gate frame portion, where each of the first and second gate frame portions include upper and lower support members, where each of the first and second gate frame portions include traversing support members traversing a distance between the upper and lower support members to tie together the upper and lower support members, and where the first and second gate frame portions are in adjacent parallel planes.

Another feature of the present invention is the provision in such a gate barrier, of a first and upper connection including a first and upper base that is configured to be engaged to the first surface, where the first and upper connection engages the first gate frame portion, and where the first gate frame portion is liftable from the first and upper base.

Another feature of the present invention is the provision in such a gated barrier, of a second and lower connection including a second and lower base that is configured to be engaged to the first surface below the first and upper base, where the second and lower connection engages the first gate frame portion, and where the first gate frame portion is liftable from the second and lower base.

Another feature of the present invention is the provision in such a gated barrier, of a third and upper connection including a third and upper base that is configured to be engaged to the second surface, where the third and upper connection engages the second gate frame portion, and where the second gate frame portion is liftable from the third and upper base.

Another feature of the present invention is the provision in such a gated barrier, of a fourth and lower connection including a fourth and lower base that is configured to be engaged to the second surface below the third and upper base, where the fourth and lower connection engages the second gate frame portion, and where the second gate frame portion is liftable from the fourth and lower base.

Another feature of the present invention is the provision in such a gated barrier, of the first and upper connection and the second and lower connection having respective first and second pins that are incrementally engagable to and away from the first gate frame portion in a longitudinal direction, and of the third and upper connection and the fourth and lower connection having respective third and fourth pins that are incrementally engagable to and away from the second gate frame portion in a longitudinal direction.

Another feature of the present invention is a barrier having four structurally different corner gate connections.

An advantage of the present invention is a top of stairs gate that can be shipped and stored in a carton of minimal size. A feature contributing to this advantage is the gate frame having first and second gate frame portions. Another feature contributing to this advantage is the intermediate connection that ties the first and second gate frame portions together such that the first and second gate frame portions act as one piece with minimal lateral, longitudinal, and height-wise movement relative to each other when the end user sets up the gate apparatus.

Another advantage of the present invention is that the gate frame can be easily opened and closed. A feature contributing to this advantage is the structure of the first and upper connection having a pivot hook that automatically opens and closes.

Another advantage of the present invention is that the gate frame is relatively safe from operation by toddlers. For example, the gate frame requires two steps to open. To open the gate frame, the gate frame must be unhooked by the pivot hook at the first and upper connection, and then the gate frame must be lifted to clear the first and upper connection while the pivot hook is held at an out-of-the-way position.

Another advantage of the present invention is that the gate frame is relatively easy to close. For example, the gate frame is lifted and then, while the gate frame is in the lifted position, the gate frame is swung into the first and upper connection to make contact with the first and upper connection, whereupon the first and upper connection opens automatically and then closes automatically to engage the gate frame without the first and upper connection being touched by the end user.

Another advantage is that the present invention may be easily customized to fit the width of a passageway in a home. For example, each of the four corner connections of the gate frame can be lengthened or shortened in the longitudinal direction.

Another advantage is that the present invention may be easily removed from a passageway of a home and then easily reinstalled in the passageway. For example, while all four connections permit lifting of the gate frame, a step that is required to open the gate, only the third and upper connection retains the gate frame from being vertically removed from its location in the passageway. This third and upper connection has a limiter that in the closed position restricts how high the gate frame may be lifted and that in the open position permits the gate frame to be vertically removed from the third and upper connection, thus also permitting the gate frame to be removed from the fourth and lower connection. For reinstallation, the limiter is slid to the open position, whereupon the third and upper and fourth and lower connections are established, and whereupon the limiter is slid to the closed position to again retain the gate frame from inadvertently being disengaged from its location in the passageway by being lifted, an action that is required to open the gate.

Another advantage of the present invention is that the barrier is easy to set up and operate. One feature contributing to this advantage is that the connections on the latch side of the gate frame are structurally similar but structurally different to maximize an ease of understanding for the end user as to which connections are located on the latch side of the gate frame. Another feature contributing to this advantage is that the connections on the swing or pivot side of the gate frame are structurally similar but structurally different to further maximize an ease of understanding for the end user as to which connections are located on the swing side of the gate frame.

BRIEF DESCRIPTION OF THE DRAWINGS

FIG. 11A is an isolated rear perspective view of the base of the upper right corner connection of FIG. 9.

FIG. 11B is an isolated rear elevation view of the base of the upper right corner connection of FIG. 11A.

FIG. 11C is an isolated side elevation view of the base of the upper right corner connection of FIG. 11A.

FIG. 11D is an isolated front elevation view of the base of the upper right corner connection of FIG. 11A.

DESCRIPTION

Figure 1:
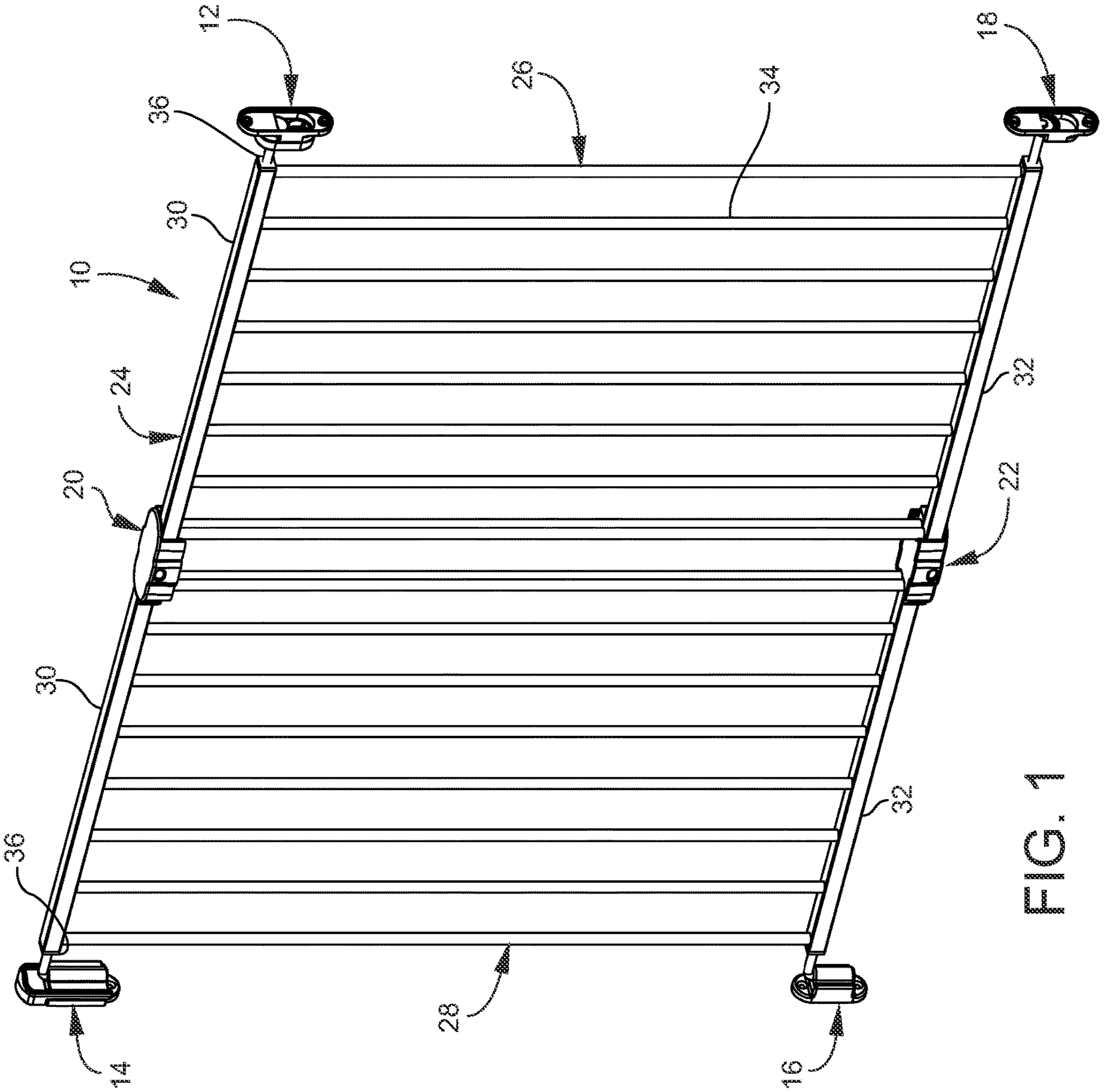
FIG. 1 is a perspective view of the present gate.
Figure 2:
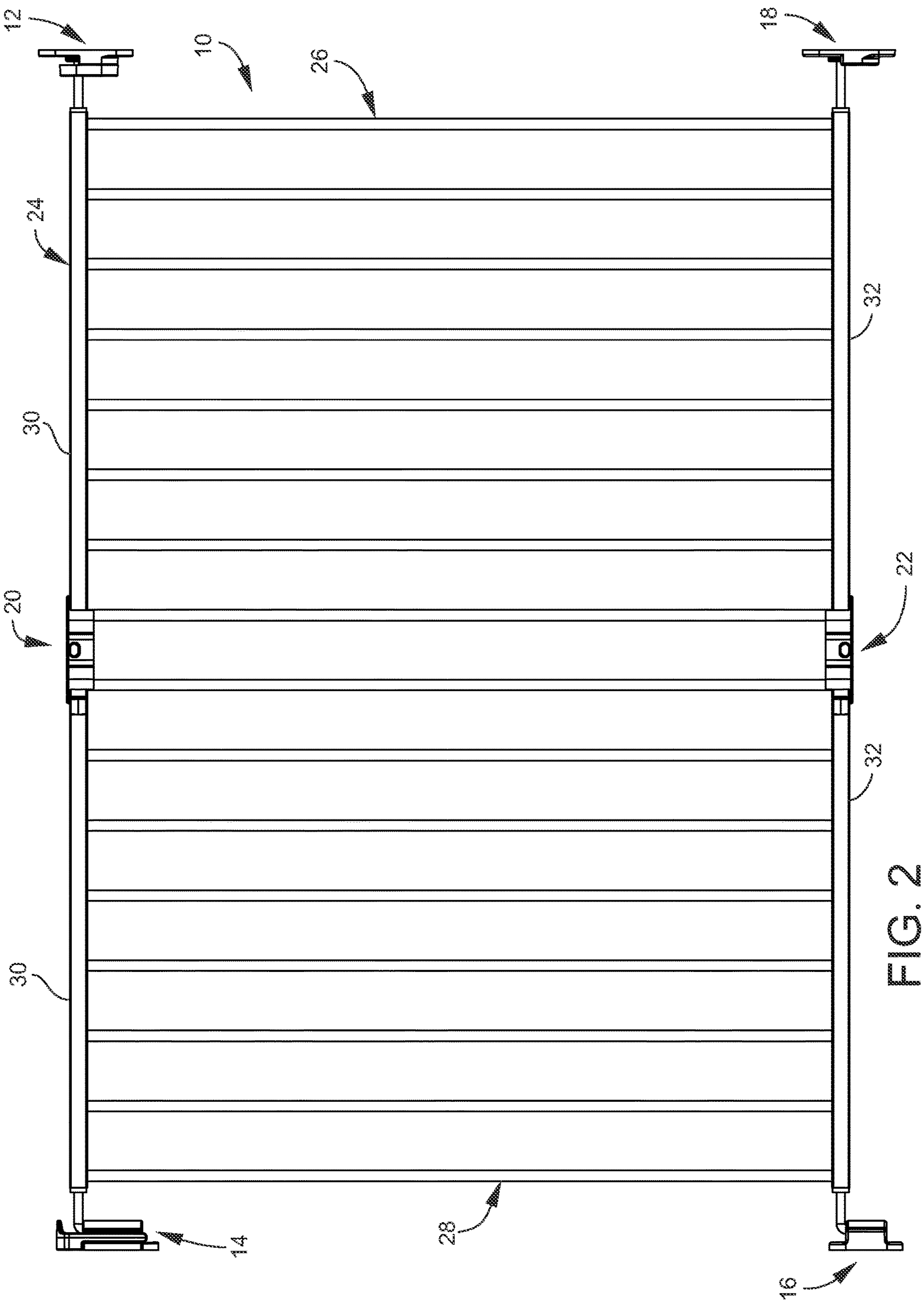
FIG. 2 is an elevation view of the gate of FIG. 1.

As shown in FIG. 1, the present gate apparatus is indicated by reference numeral 10. Gate apparatus 10 includes an upper right connection 12, an upper left connection 14, a lower left connection 16, and a lower right connection 18. The gate apparatus 10 further includes an upper intermediate connection 20 and a lower intermediate connection 22.

The gate apparatus 10 further includes a gate frame 24. Gate frame 24 includes a first frame portion 26 and a second frame portion 28. The frame portions 26, 28 are identical to each other such that only the first frame portion 26 is described below.

Figure 3:
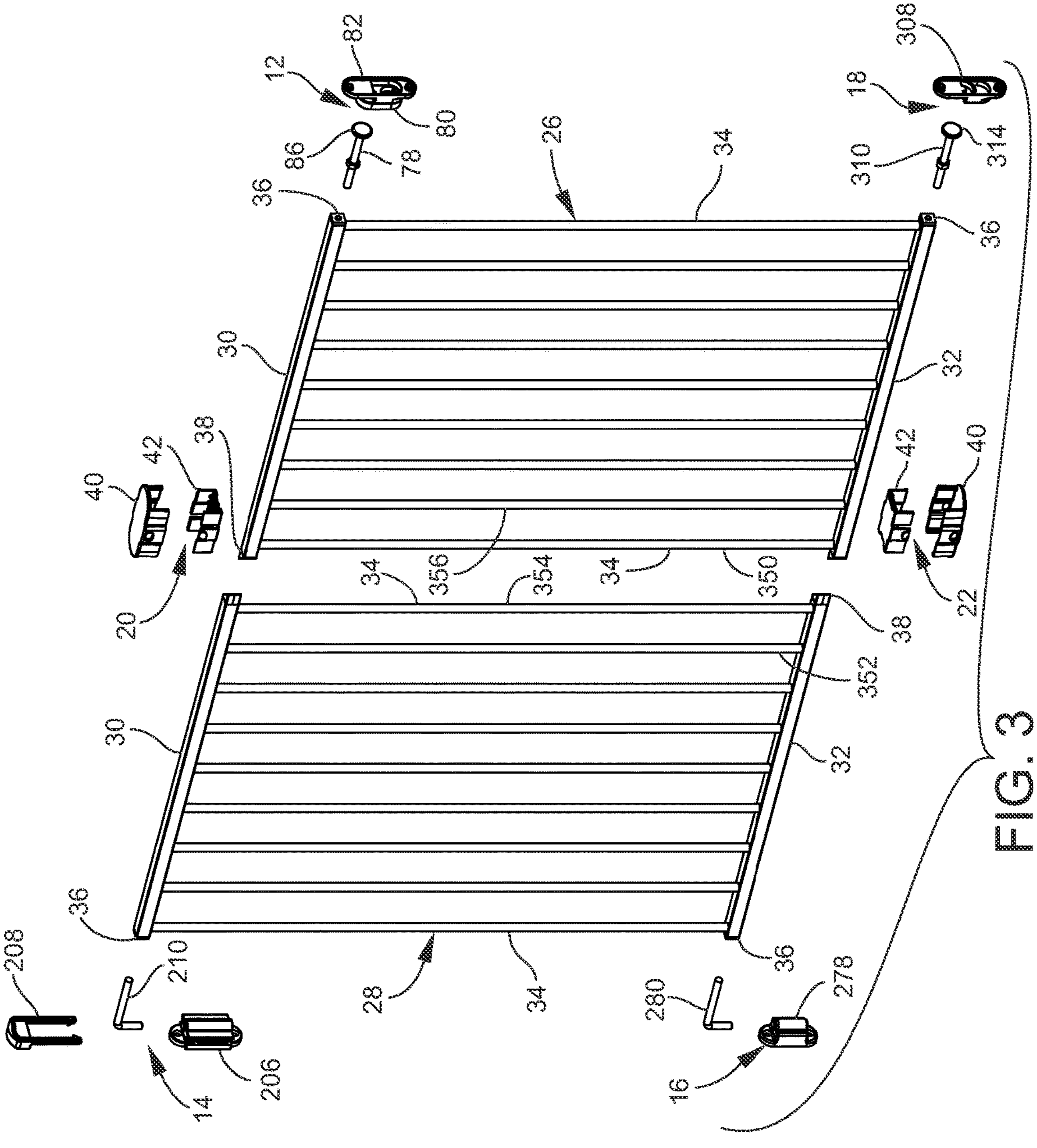
FIG. 3 is a perspective exploded view of the gate of FIG. 1.
Figure 4:
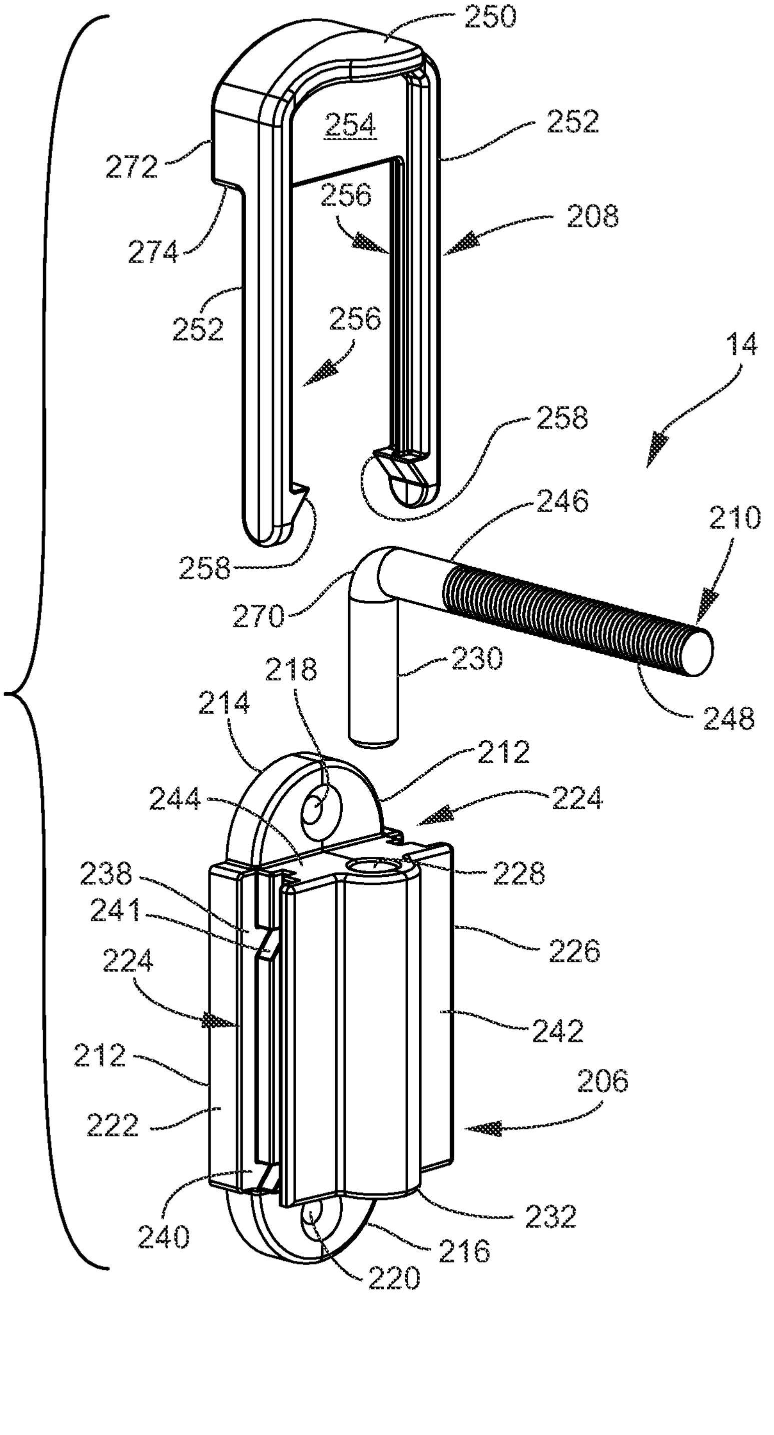
FIG. 4 is a perspective exploded view of the upper left corner connection of the gate of FIG. 1.
Figure 5B:
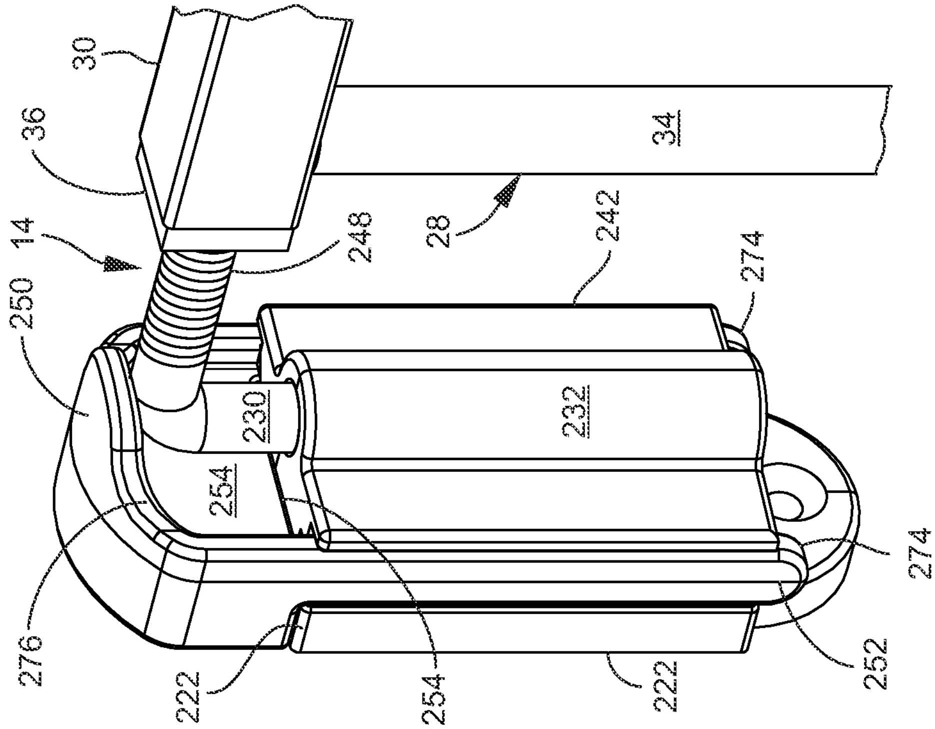
FIG. 5B is a perspective view of the upper left corner connection of FIG. 5A when the gate is being opened, and shows how the upper left corner connection remains engaged when the right side connections are disengaged.
Figure 5A:
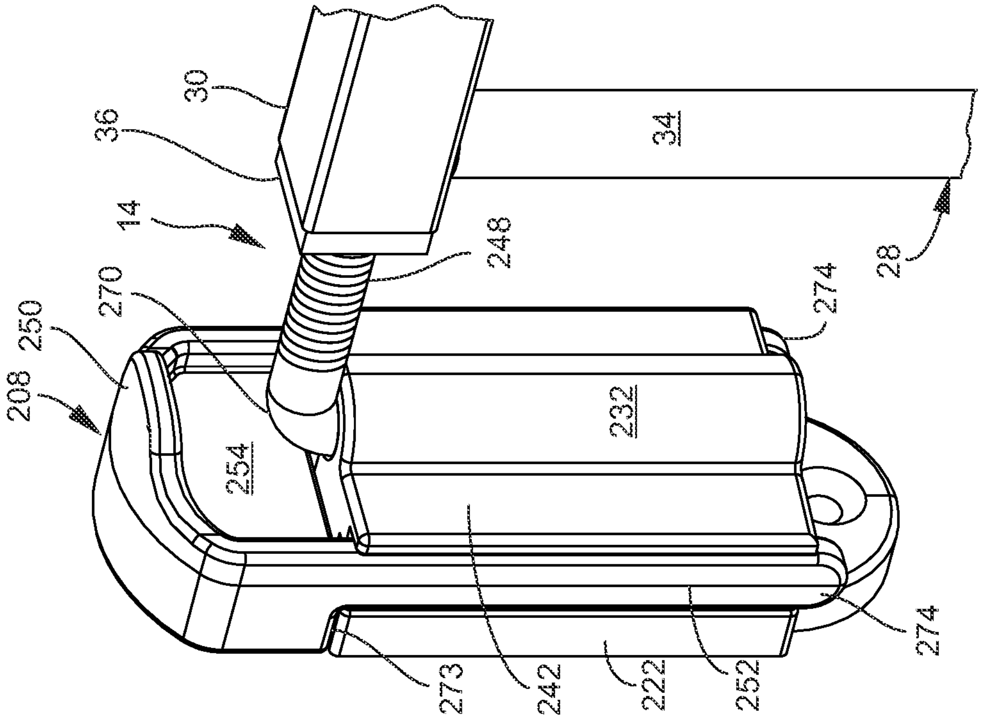
FIG. 5A is a perspective view of the upper left corner connection of FIG. 4 when the gate is closed.
Figures 6A, 6B, 6C:
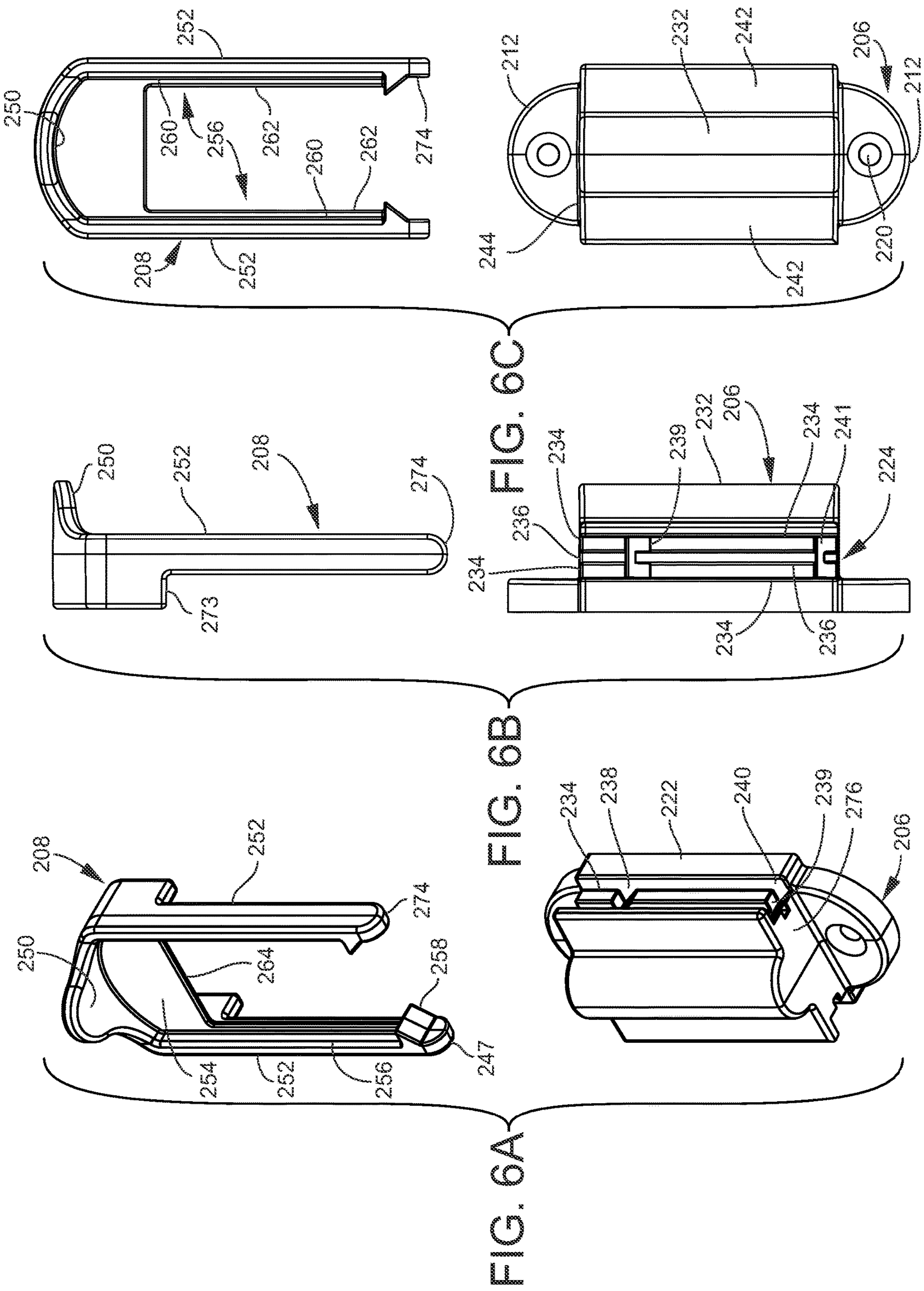
FIG. 6A shows an exploded perspective view of the upper left corner connection of the gate of FIG. 1.
FIG. 6B shows an exploded side view of the upper left corner connection of FIG. 6A.
FIG. 6C shows an exploded front view of the upper left corner connection of FIG. 6A.
Figures 7A, 7B, 7C:
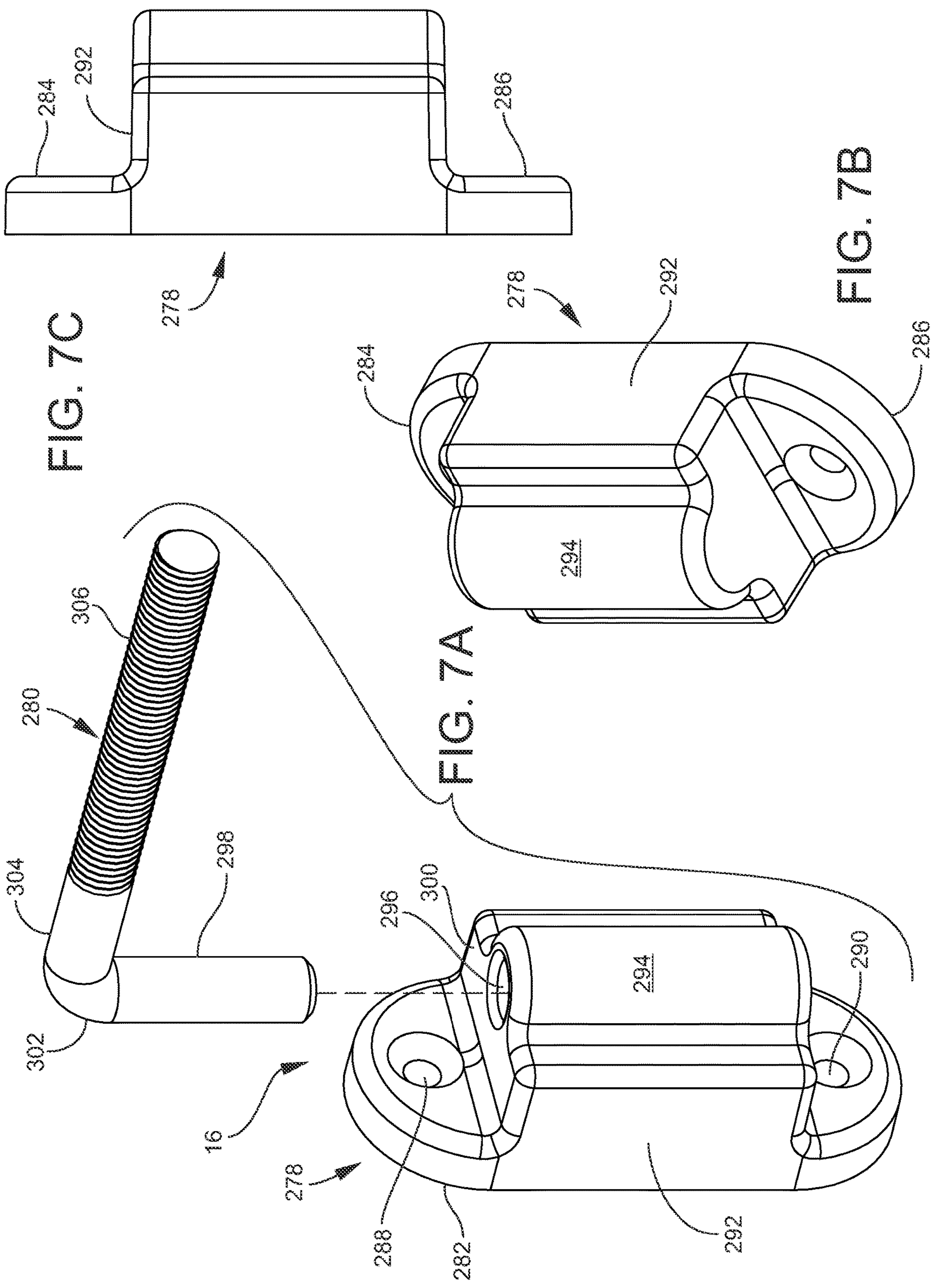
FIG. 7A shows a perspective view of the lower left corner connection of the gate of FIG. 1.
FIG. 7B shows a perspective view from below of the lower left corner connection of FIG. 7A.
FIG. 7C shows a side view of the lower left corner connection of FIG. 7A.
Figure 8B:
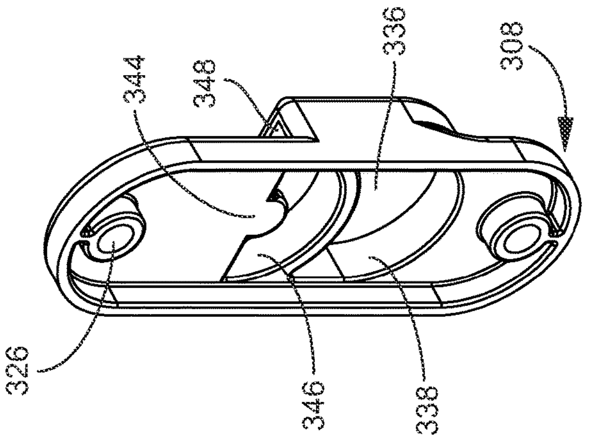
FIG. 8B is a perspective rear view of the lower right corner connection of FIG. 8A.
Figure 8C:
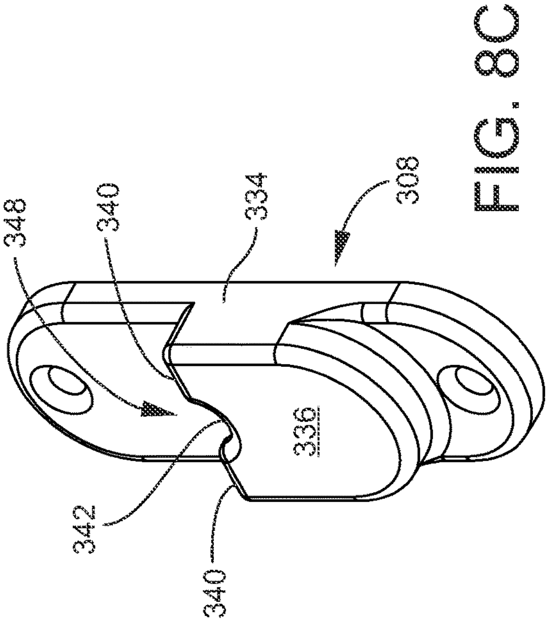
FIG. 8C is a perspective front view of the lower right corner connection of FIG. 8A.
Figure 8A:
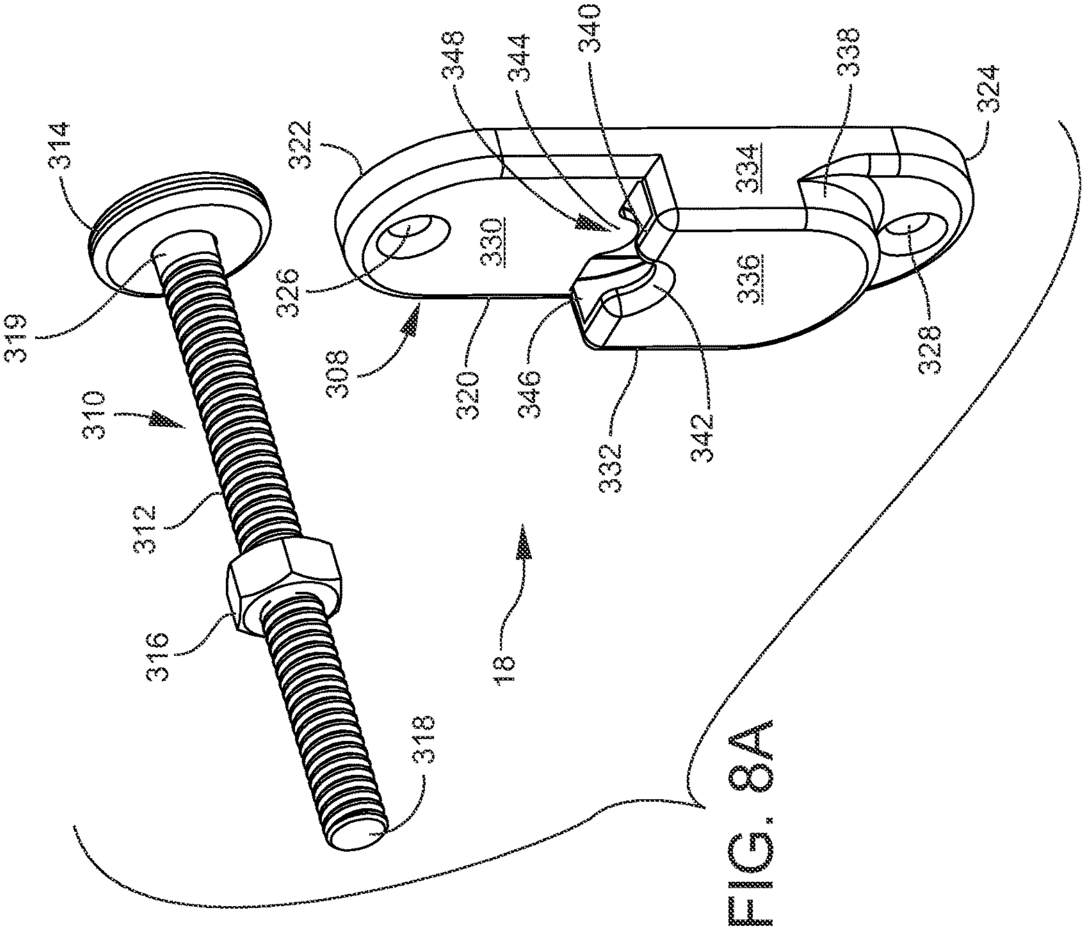
FIG. 8A is an exploded perspective view of the lower right corner connection of the gate of FIG. 1.
Figure 9:
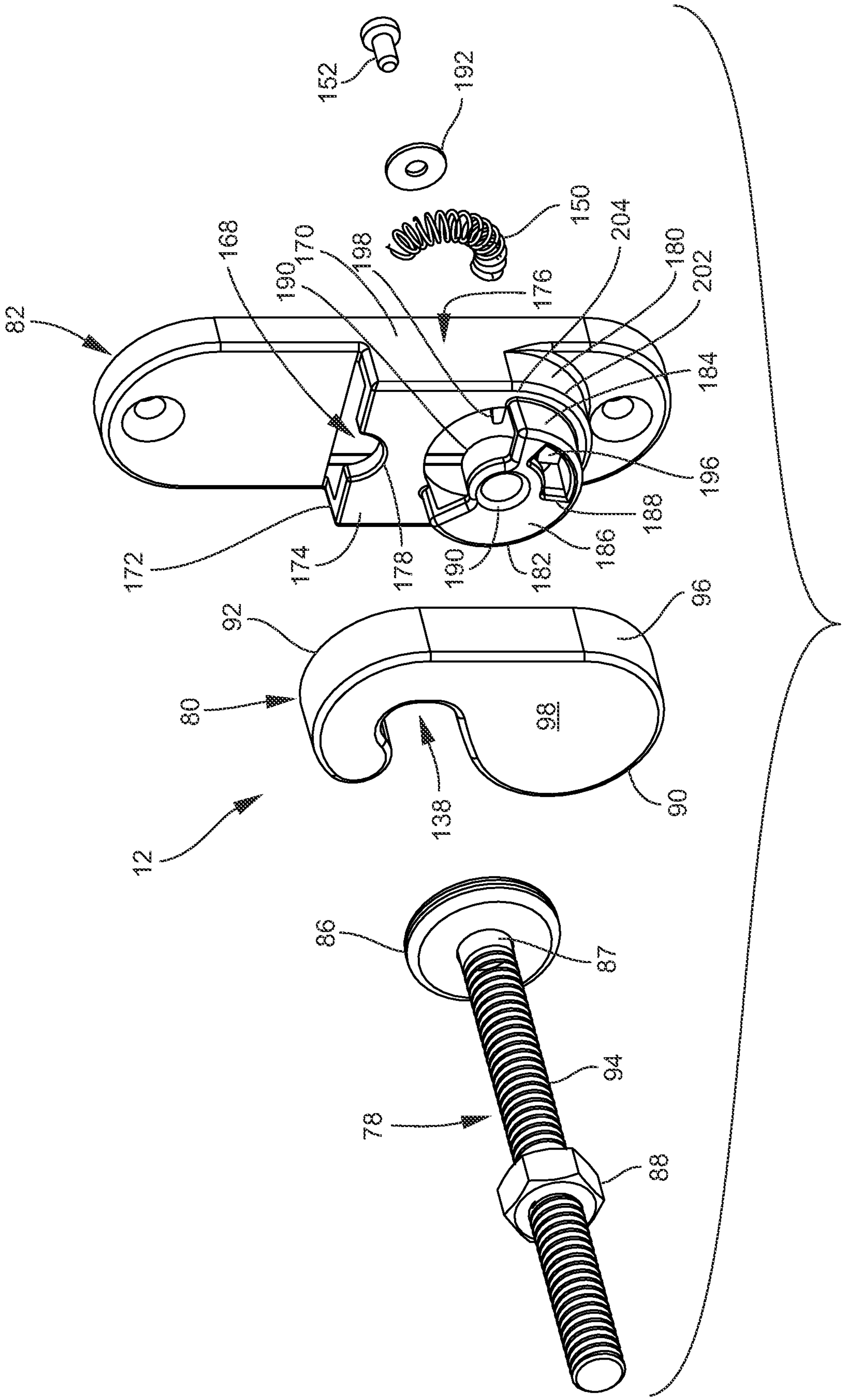
FIG. 9 is an exploded perspective view of the upper right corner connection of the gate of FIG. 1.

First frame portion 26 includes an upper support member 30 extending horizontally and a lower support member 32 extending horizontally. Extending to and between the upper and lower support members 30, 32 are a set of eight vertical or traversing support members 34 to tie the upper and lower support members 30, 32 to each other. Each of the upper and lower support members or rails 30, 32 extends transversely and is straight, tubular and rigid. Each of the vertical support members 34 is straight, tubular and rigid. First frame portion 26 is one-piece and integral. The vertical support members 34 are spaced apart from each other in an equidistant manner. As shown in FIG. 3, an outer end vertical support member 34 is engaged to each of the upper and lower support members 30, 32 at a position adjacent to the outer ends of the upper and lower support members 30, 32. As shown in FIG. 3, an inner end vertical support member 34 is engaged to each of the upper and lower support members 30, 32 at a position adjacent to inner ends of the upper and lower support members 30, 32. Upper and lower support members 30, 32 are rectangular or square in section. Vertical support members 34 are cylindrical. Each of the outer ends of the upper and lower support members 30, 32 includes a fixed nut 36 having a threaded opening. Each of the inner ends of the upper and lower support members 30, 32 includes a triangular block insert 38. The oblique face of the triangular block insert 38 provides an inclined transition from one support member to the other support member 30 or from one support member 32 to the other support member 32 when the first and second frame portions 26, 28 are engaged to each other.

First and second frame portions 26, 28 are engaged to each other by the upper and lower intermediate connections 22. The intermediate connections 20, 22 are identical to each other such that only the upper intermediate connection 20 is described. The lower intermediate connection 22 is turned upside down when on the gate apparatus 10.

Intermediate connection 20 is shown in FIGS. 1, 2, 3, 13A, 14A, 14B, 14C, 15A, 15B, 15C, 15D, 15E, 15F, 16A, 16B, 16C, 16D, and 16E. Intermediate connection 22 is shown in FIGS. 1, 2, 3, and 13B.

Intermediate connection 20 has an outer portion 40 and an inner portion 42. Outer portion 40 is generally U-shaped. Outer portion 40 is integral and one-piece. Outer portion 40 includes a ceiling 44 and a pair of spaced apart sidewalls 46, 48. Each of the sidewalls 46, 48 has a through opening 50 formed therein. The opening 50 is adjacent to ceiling 44 and is located generally midway between the ends of the sidewall 46, 48 in which the opening 50 is formed. Opening 50 is generally an oblong shape and is elongated along an axis parallel to the ceiling 44. Ceiling 44 is solid and has no openings. Each of the sidewalls 46, 48 is stepped. Opening 50 is formed in an outermost step 52 of each of the sidewalls 46, 48. Each of the sidewalls 46, 48 includes a pair of inner steps 54, with the inner steps 54 disposed on each of the sides of the outermost step 52. Each of the ends of each of the sidewalls 46, 48 includes a turned in retainer 56. The retainer 56 travels the height of the sidewall and retains the inner portion 42 against longitudinal movement relative to the outer portion 40. There are four retainers 56, one on the end of each of the sidewalls 46, 48, and the retainers 56 abut up against ends of the inner portion 42 when the inner portion 42 is engaged to the outer portion 40. The ceiling 44 includes a flat and smooth outer surface and a flat and smooth inner surface. Ceiling 44 is a plate portion and sidewalls 46, 48 are stepped. The ends of the ceiling 44 are rounded or curved and the opposing side edges of the ceiling 44 are stepped to track the stepped shaped of the sidewalls 46, 48.

The inner portion 42 of the intermediate connection 20 is integral and one piece and includes three U-shaped portions, namely, an intermediate U-shaped portion 58 and two end U-shaped portions 60. U-shaped portions 58, 60 are integral and one-piece with each other through a floor 62, which makes up a part of each of the U-shaped portions 58, 60. Each of the end U-shaped portions 60 has a pair of opposing upright end sidewalls 64. Intermediate U-shaped portion 58 includes a pair of opposing upright intermediate sidewalls 66. Sidewalls 64, 66 are stepped such that intermediate sidewalls 66 are spaced apart a greater distance from each other than are each of the pairs of end sidewalls 64. Such spacing apart of the intermediate sidewalls 66 spaces the inner surfaces of the intermediate sidewalls 66 from the side faces of the upper and lower rails 30, 32 such that the intermediate sidewalls 66 have room or space to be pinched inwardly by tabs 68. Each of the intermediate sidewalls 66 includes this tab 68 that engages one of the openings 50 of the outer portion 40. Each of the tabs 68 includes an outer surface that is oblique or inclined. The oblique outer surface tapers inwardly and upwardly such that, when the outer and inner portions 40, 42 are brought together, the bottom edges of sidewalls 52 of outer portion 40 slide downwardly upon the oblique outer surfaces of the tabs 68 to draw in the sidewalls 52 until the tabs 68 pop into the openings 50. The tab 68 includes a protruding undersurface or retaining surface or retainer 70 that engages a lower edge forming opening 50 such that, to disengage outer portion 40 from inner portion 42, the tabs 68 are squeezed together until the undersurface 70 is free of the lower edge that forms a portion of opening 50, whereupon the outer portion 40 and inner portion 42 can be drawn apart. Each of the end edges of floor 62 includes a set of two notches or receptors 72 formed therein for receiving a cylindrical upright support member 34 from the first frame portion 26 and a cylindrical upright support member 34 from the second frame portion 28. The notches 72 of each pair are separated from each other by an extension 74. The extension 74 terminates short of a straight line extending from outermost end portions of the floor 62. The notches 72 of each pair form the shape of a W in its respective end edge of the floor 62. The intermediate sidewall 66 of the inner portion 42 engages complementary stepped inner face of the intermediate sidewall 52 of the outer portion 40 to aid in minimizing longitudinal movement of the inner portion 42 relative to the outer portion 40. The outer edges of the end sidewalls 64 of the inner portion 42 engage the retainers 56 of the outer portion 40 to also aid in minimizing longitudinal movement of the inner portion 42 relative to the outer portion 40. The floor 62 of the inner portion 42 includes a web or lattice or network 76 of raised plastic portions or strips that are integral with the inner portion 42. The network 76 of raised strips provides support among the U-shaped portions 58, 60. The network 76 is includes a pair of lateral straight sections engaging opposing end walls 64 and floor 62, which lateral straight portions of the network 76 are engaged to each other by longitudinal straight sections, which longitudinal straight sections traverse and engage the floor section between sidewalls 66 to engage longitudinal straight sections arriving from the other pair of opposing end walls 64. Network 76 provides lateral rigidity to opposing end walls 64 and floor 62, longitudinal rigidity to floor 62 between longitudinally opposing notches 72, and bypasses intermediate opposing sidewalls 66 to permit flexibility or resiliency to intermediate opposing sidewalls 66. Network 76 further spaces the floor 62 from imperfections such as weld portions that may be present on the gate frame 24.

When engaged to each other, the outer and inner portions 40, 42 make up the intermediate connection 20 or the intermediate connection 22. The intermediate connection 20 provides a longitudinal through opening 78 for adjacent upper rails 30, where one upper rail 30 is provided by the first frame portion 26 and where the other upper rail 30 is provided by the second frame portion 28. The intermediate connection 22 provides a longitudinal through opening 78 for adjacent lower rails 32, where one lower rail 32 is provided by the first frame portion 26 and where the other lower rail 32 is provided by the second frame portion 28.

The first and second frame portions 26, 28 may be aligned such that two adjacent upright support members 34 of first frame portion 26 are disposed directly lateral of two adjacent upright support members 34 of second frame portion 28 to form a set of four upright support members 34. Then, to form upper intermediate connection 20, the inner portion 42 is first inserted longitudinally between 1) one set of two upright support members 34 disposed directly laterally of each other and 2) the other set of two upright support members 34 disposed directly laterally of each other. Then the inner portion 42 is slid upwardly and over the side faces of the upper rails 30 such that the side faces of the upper rails 30 confront the inner faces of the end sidewalls 64 and such that the inner faces of the intermediate sidewalls 66 are spaced from the side faces of the upper rails 30 such that the intermediate sidewalls 66 can be squeezed together by the tabs 66. Here the notches 72 receive the upright support members 34. Then the outer portion 40 is snapped onto the lower portion 42 such that the tabs 68 snap into or lock into the openings 50 of the intermediate sidewall portions 52. In a similar manner, the lower intermediate connection 22 can be formed. The inner portion 42 is inserted between the upright support members 34 directly vertically underneath the upper intermediate connection 20 and then slid downwardly to capture the lower rails 32. Then the outer portion 40 is snapped upwardly and onto the lower portion 42 to form the lower intermediate connection 22.

Once the upper and lower intermediate connections 20, 22 are locked in place the first and second frame portions 26, 28 are engaged in a rigid manner relative to each other. In other words, the first and second frame portions 26, 28 are not slideable longitudinally relative to each other. Nor are the first and second frame portions 26, 28 slideable height-wise or vertically relative to each other. The first and second frame portions 26, 28 are fixed in adjacent parallel planes relative to each other by the upper and lower intermediate connections 20, 22. The first and second frame portions 26, 28 when fixed to each other by the upper and lower intermediate connections 20, 22 are structurally one gate or one piece that can swing open and closed.

The upper right connection 12 is shown in FIGS. 9, 10B, 10C, 10D, 11A, 11B, 11C, 11D, 12A, 12B and 12C. The upper right connection 12 includes a pin 78, a pivot hook 80, and a base 82.

Pin 78 includes a threaded shaft or stem 84, a head 86, and a nut 88. Nut 88 may be turned from the distal end of the shaft 84 to just short of the proximal end of the shaft 84 where the head 86 is located. Nut 88 may be turned off of shaft 84. Shaft 84 is threaded from the proximal end to just short of the distal end. Head 86 is shaped in the form of a disk and includes an annular perimeter. Shaft 84 is threadingly engaged to nut 36 such that the head 86 can be positioned at incremental distances from nut 36 that is located at the outer end of the upper support member 30 of first frame portion 26. Head 86 is disposed at a right angle to shaft 84. Pin 78 includes an unthreaded smooth portion 87 immediately adjacent to the head 86.

Pivot hook 80 is one-piece and integral. Pivot hook 80 includes a main body portion 90 and a hook portion 92 protruding from the main body portion 90. Main body portion 90 has an axis 94. Pivot hook 80 includes an endless sidewall 96 running about the main body portion 90 and hook portion 92. Pivot hook 80 includes a front wall 98. Each of the main body portion 90 and hook portion 92 has the front wall 98 which extends uninterrupted from the main body portion 90 to the hook portion 92. The sidewall 96 undulates about the main body portion 90 and hook portion 92. Sidewall 96 includes a circular portion running from reference point 100 to reference point 102 and this circular portion is designated as segment 104. Sidewall 96 includes a straight portion running from reference point 102 to reference point 106 and this straight portion is designated as segment 108. Sidewall 96 includes a circular portion running from reference point 106 to reference point 110 and this circular portion is designated as segment 112. Sidewall 96 includes a circular portion running from reference point 110 to reference point 114 and this circular portion is designated as segment 116. Sidewall 96 includes a circular portion running from reference point 114 to reference point 118 and this circular portion is designated as segment 120. Sidewall 96 includes a straight portion running from reference point 118 to reference point 122 and this straight portion is designated as segment 124. Sidewall 96 includes a circular portion running from reference point 122 to reference point 126 and this circular portion is designated as segment 128. Sidewall 96 includes a generally straight portion running from reference point 126 to reference point 100 and this generally straight portion is designated as segment 130. Sidewall 96 includes segments 104, 108, 112, 116, 120 124, 128, and 130 that form the endless sidewall 96.

Hook portion 92 includes an oblique sidewall section 132. This oblique sidewall section 132 runs from reference point 134 to reference point 136 in FIG. 12A. When pin 78 hits this oblique sidewall section 132 such as when the gate frame 24 is being dropped into the upper right connection 12, the pivot hook 80 swings out of the way. Part of oblique sidewall section 132 is found in segment 112 and part of oblique sidewall section 132 is found in segment 116. Pivot hook 80 includes a vertical axis and reference point 134 is found on this vertical axis. This vertical axis defines front and rear sides of the pivot hook 80. If the pin shaft 84 of the gate frame 24 hits the front side of the pivot hook 80, the pivot hook 80 swings. If the pin shaft 84 of the gate frame 24 hits the back side of the pivot hook 80, the pivot hook 80 cannot swing. Gate apparatus 10 is configured such that the pin shaft 84 of the gate frame 24 hits the front side, and not the back side, of the pivot hook 80.

Pivot hook 80 includes a pin receiver 138 formed between the main body portion 90 and hook portion 92. Pin receiver 138 is formed by a portion of segment 116, all of segment 120, all of segment 124, all of segment 128, all of segment 130, and a portion of segment 104. Circular segment 120 of the pin receiver 138 works as a retainer against a swinging of the pivot hook 80. That is, if the pin shaft 84 of the gate frame 24 is lifted up, the pivot hook 80 is urged to pivot neither one way nor the other way by the circular segment 120. When the pin shaft 84 is a rest, the pin shaft 84 rests adjacent to segments 120, 124, and 128.

Pivot hook 80 includes a free end 140. When the pivot hook 80 is swung to an out-of-the-way position, the free end 140 of the hook portion 92 is positioned to an out-of-the-way position such that the pin shaft 84 may be lifted up in a vertically straight fashion with no tangential portion of the pin shaft 84 hitting the free end of the hook portion 92.

The pivot hook 80 is receptacle shaped. In other words, the combination of the endless sidewall 96 and the front wall 98 would hold water if the pivot hook 80 is held in a horizontal position. In still other words, this combination of the endless sidewall 96 and front wall 98 forms an inner chamber 142. Extending inwardly at a right angle from the front wall 98 and disposed in this inner chamber 142 is a stem 142, a boss confronting wall 144, a spring end confronting wall 146, a spring side confronting wall 148, and a stop tab 149. A center of stem 142 defines axis 94. Boss confronting wall 144 confronts boss 190 found on base 82. Spring end confronting wall 146 abuts one end of coil spring 150. Spring side confronting wall 148 confronts a side of coil spring 150. Stop tab 149 swings between stop position 189 where the pivot hook 80 is closed and stop position 187 where the pivot hook 80 is open and permits pin 78 to be lifted vertically and out of socket 168. Stem 142 engages pin 152, which also engages base 82.

Base 82 includes a foundation 154 that is oblong in shape. The foundation 154 includes an upper portion 156 having a pin hole 158 for receiving a pin that is engaged to a structure such as a wall or door jamb in a house. The foundation 154 includes a lower portion 160. Upper and lower portions 156, 160 have respective front walls 164, 166. Front wall 164 of upper portion 156 terminates at a lower straight edge 165. Front wall 166 of lower portion 160 terminates at an upper circular edge 167. Extending rearwardly from front wall 164 is a boss 169 for pin hole 158. Extending rearwardly from front wall 166 is a boss 171 for pin hole 162.

Figure 10D:
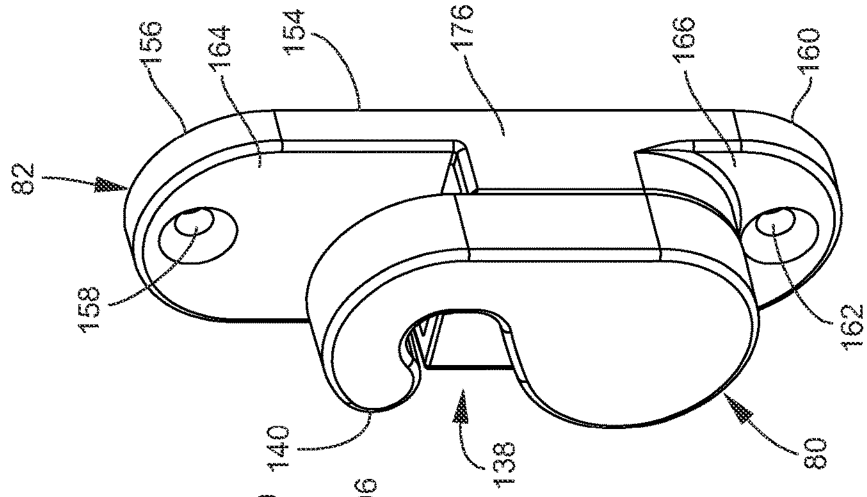
FIG. 10D is a perspective view of the upper right corner connection of FIG. 10C.
Figure 10C:
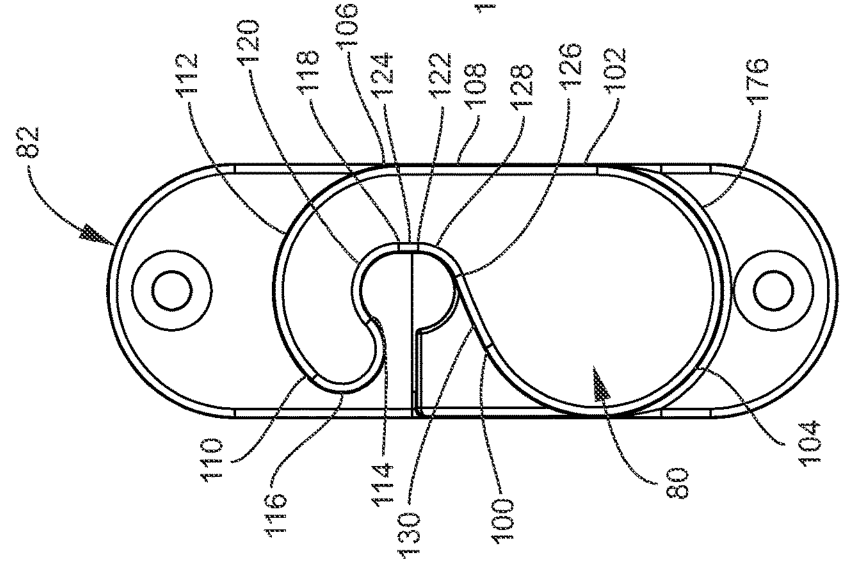
FIG. 10C is a front elevation view of the upper right corner connection of FIG. 9.
Figure 10A:
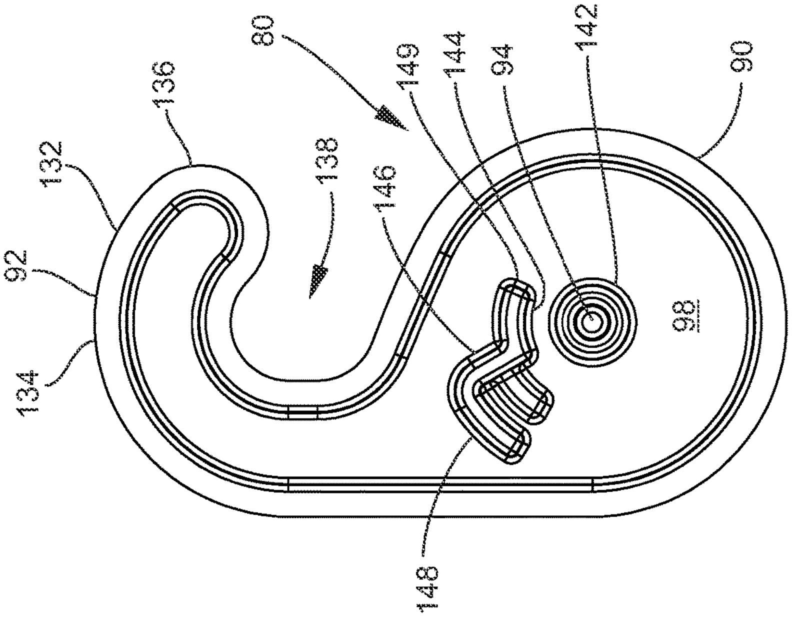
FIG. 10A is an isolated rear elevation view of the pivot hook of the upper right corner connection of FIG. 9.
Figure 10B:
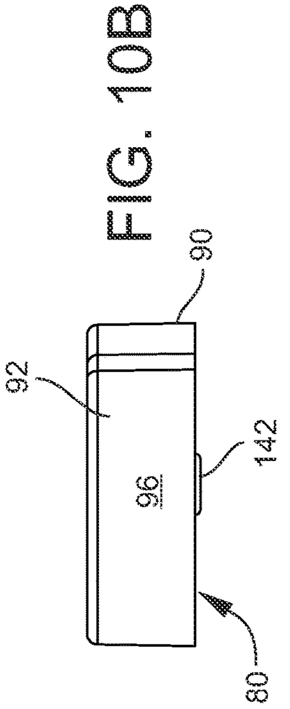
FIG. 10B is an isolated top view of the pivot hook of the upper right corner connection of FIG. 10A.

Base 82 includes a socket 168 formed immediately below the front wall 164 of the upper portion 156. Socket 168 is formed or defined by a first sidewall 170, a second sidewall 172, a front wall 174, and the lower straight edge 165 of front wall 164 of upper portion 156 that form in part a socket housing 176. Socket housing 176 is further formed by a circular lower wall 180 that joins the first and second sidewalls 170, 172. The upper edge of front wall 174 of socket housing 176 includes a semi-circular cutout 178 that is a receiver for the smooth unthreaded pin shaft portion 87 of pin shaft 84. Socket 168 is a receiver for the pin head 86. The depth of the cutout 178 is about one-half of the diameter of the pin shaft 84. The depth of the socket 168 is greater than one-half the diameter of the pin head 86. As shown in FIG. 10C, the cutout 178 and segments 128, 124, and 120 of the sidewall 96 capture the pin shaft 84. Segment 128 and one-half of segment 124 are disposed adjacent to a portion of cutout 178 in the depth direction.

Socket housing 176 is a mount for a pivot hub 182. Pivot hub 182 is integral and one-piece with the socket housing 176 and foundation 154. Pivot hub 182 includes a circular wall 184 that extends from the three o'clock position to a position between ten o'clock and eleven o'clock and includes the four, five, six, seven, eight, and nine o'clock positions. Pivot hub 182 includes a front wall 186. Front wall 186 extends from the three o'clock position 187 to a position 189 between ten o'clock and eleven o'clock and includes the four, five, six, seven, eight, and nine o'clock positions, except that front wall 186 includes a cutout 188, for inserting the coil spring 150 during assembly, running from about the four o'clock position to the six o'clock position and includes the five o'clock position. Extending rearwardly from the front wall 186 is a boss 190 for receiving the stem 142 of the pivot hook 80 and for further receiving washer 192 and pin 152. Washer 192 abuts a rear portion of the boss 190.

Pivot hub 182 includes an opening 194 between the terminal ends of circular wall 184. This opening 194 is formed circumferentially between 1) stop position 189 between ten o'clock and eleven o'clock and 2) the three o'clock stop position 187 and includes the twelve o'clock and one o'clock positions. The opening 194 extends radially from boss 190. This opening 194 receives portions of the pivot hook 80, including the rearwardly extending boss confronting wall 144, the spring end confronting wall 146, the spring side confronting wall 148, and stop tab 149.

Viewed from the rear of the pivot hub 182, it can be seen that the pivot hub 182 includes a pair of coil spring retaining tabs 196, 198. Tab 196 extends inwardly radially from the circular wall 184 between the four o'clock and six o'clock positions, including the five o'clock position (relative to the front of the base 82). Tab 196 extends inwardly radially from the circular wall 184 at about the three o'clock position (relative to the front of the base 82).

Pivot hub 182 further includes a boss support 200 extending radially from circular wall 184 to boss 190. Boss support 200 is a spring end confronting wall such that coil spring 150 is compressed between spring end confronting wall or boss support 200 of the base 82 and spring end confronting wall 146 of the pivot hook 80.

Front wall 174 of the socket housing 176 includes an upper edge having cutout 178 and a lower U-shaped edge 202. Pivot hub 182 is mounted on the socket housing 176 within the lower U-shaped edge 202 such that a circular portion 204 of the front wall 174 serves as a mount for the inner edge of a portion of the sidewall 96, which portion includes a part of segment 100 and all of segment 104.

A portion of the endless inner face of endless sidewall 96 confronts circular wall 184 of pivot hub 182. A portion of front wall 98 confronts front wall 186. A portion of the endless inner edge of the endless sidewall 96 confronts front wall 174.

The width of the main body portion 90 is about equal to the width of the base 82. When pivot hook 80 is in the closed position, the pivot hook 80 is contained within or disposed at the edges of the base 82. Pivot hook 80 has a height less than the height of the base 82.

Coil spring 150 is contained in a channel or tube formed by a combination of the pivot hook 80 and the pivot hub 182. The channel is closed at both ends defined by the spring end confronting wall 146 of the pivot hook 80 and the spring end confronting wall 200 of the pivot hub 182. Sides of the channel include the spring side confronting wall 148 of the pivot hook 80 and the front wall 98 of the pivot hook 80. Sides of the channel further include the inner faces of the spring retaining tabs 196 and 198. Another side of the channel further includes the inner face of circular wall 184 of pivot hub 182. Another side of the channel includes the outer circular face of boss 190 of pivot hub 182.

Figures 12A, 12B, 12C:
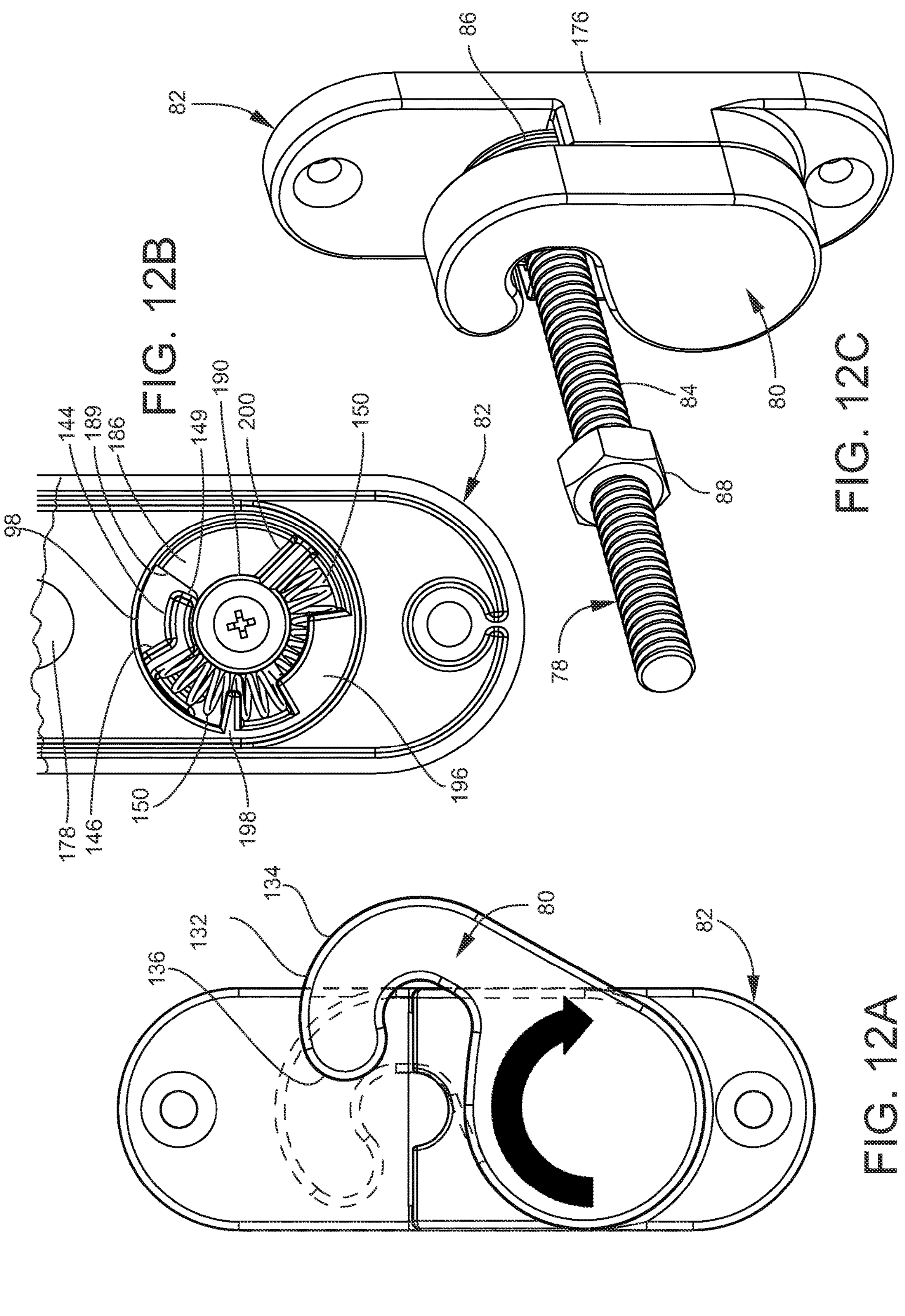
FIG. 12A is a front view of the upper right corner connection of FIG. 9 showing how the pivot hook is swung to an out-of-the-way position.
FIG. 12B is a partial rear view of the base of the upper right corner connection of FIG. 9.
FIG. 12C is a perspective view of the upper right corner connection of FIG. 9.
Figure 13B:
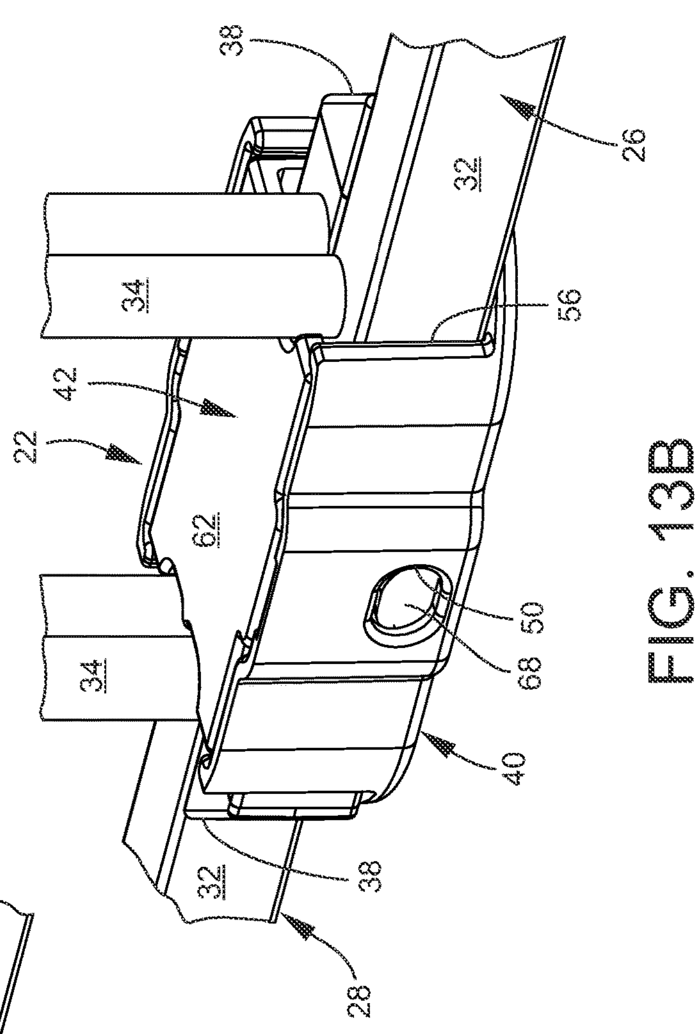
FIG. 13B is a perspective view of an intermediate connection on the lower rails of the gate of FIG. 1.
Figure 13A:
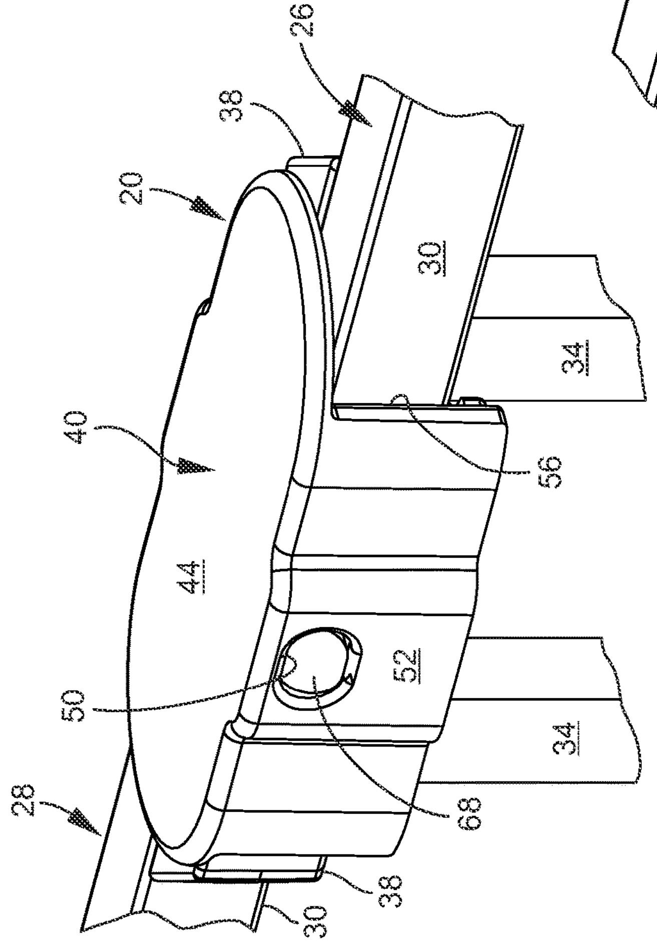
FIG. 13A is a perspective view of an intermediate connection on the upper rails of the gate of FIG. 1.
Figure 14C:
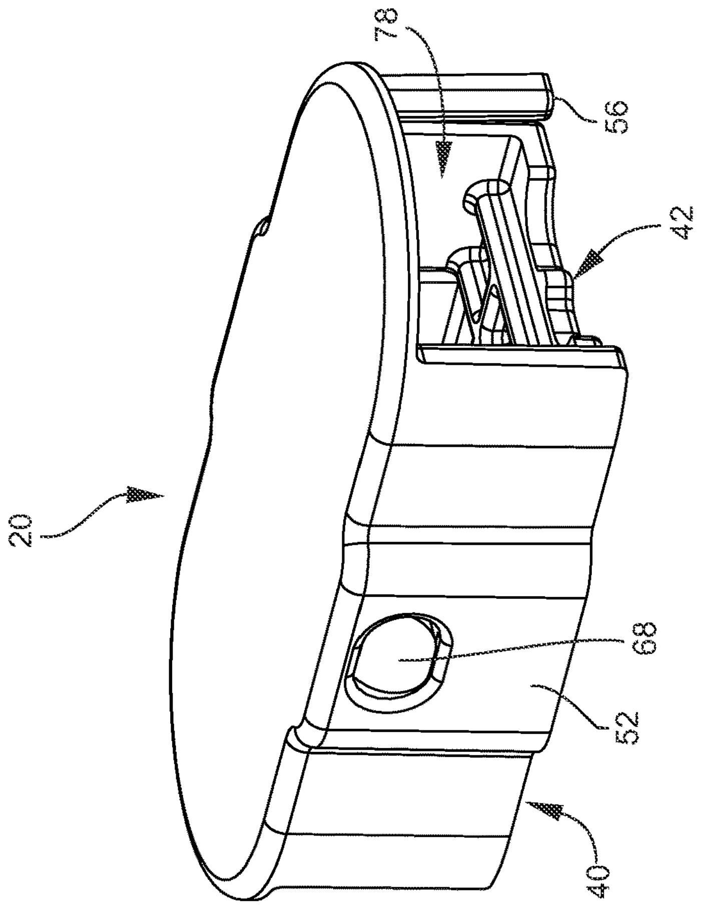
FIG. 14C is a perspective view of the intermediate connection of FIG. 13A.
Figure 14A:
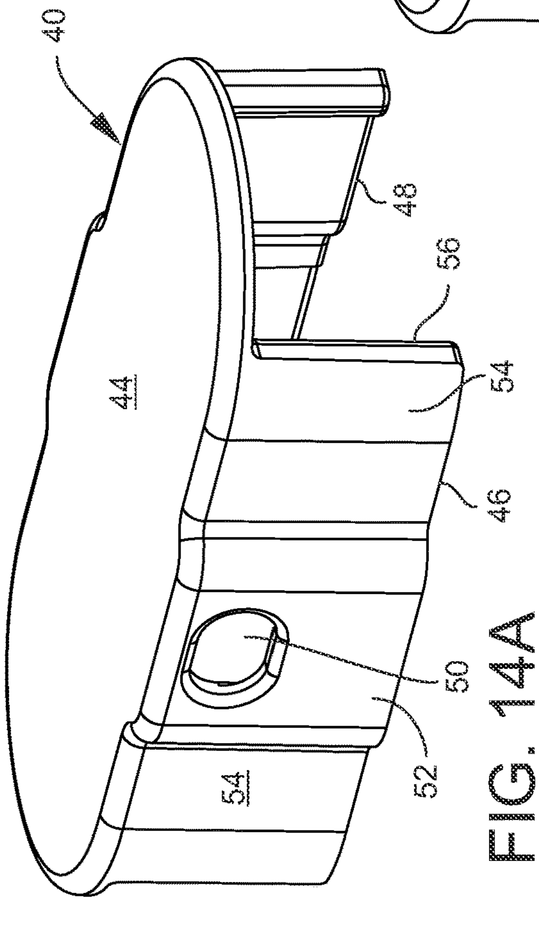
FIG. 14A is a perspective view of the upper and outer portion of the intermediate connection of FIG. 13A.
Figure 14B:
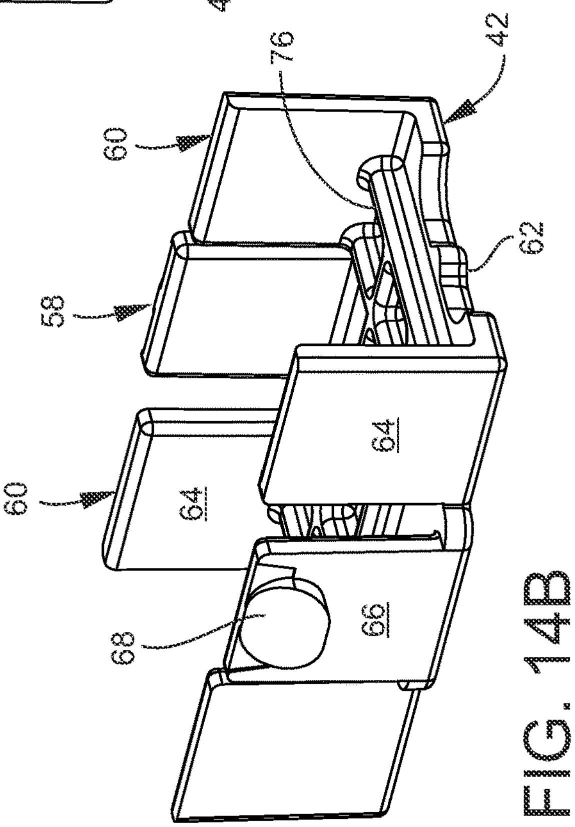
FIG. 14B is a perspective view of the lower and inner portion of the intermediate connection of FIG. 13A.
Figures 15A, 15B, 15C, 15D, 15E, 15F:
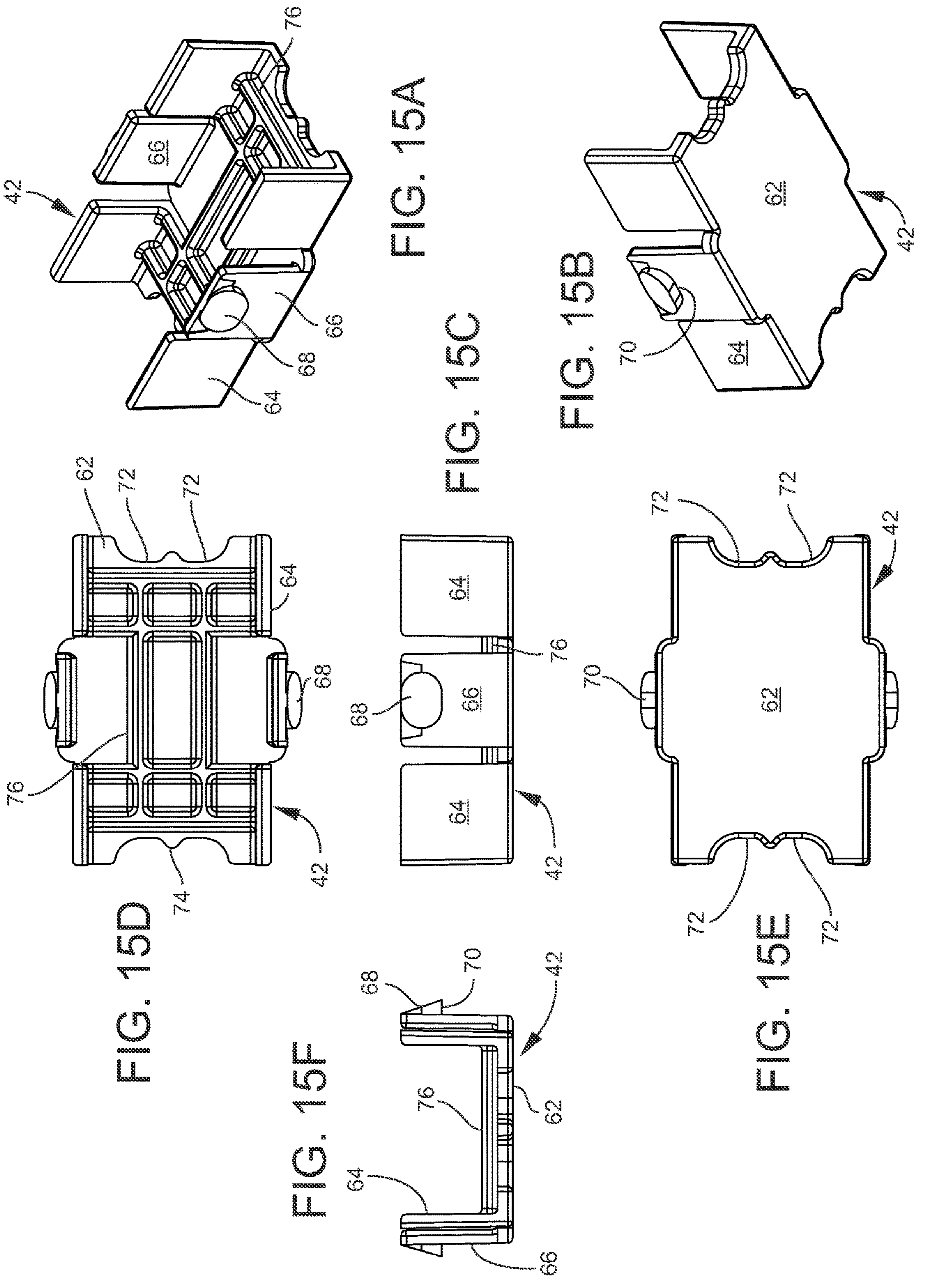
FIG. 15A is a top perspective view of the lower and inner portion of the intermediate connection of FIG. 13A.
FIG. 15B is a bottom perspective view of the lower and inner portion of the intermediate connection of FIG. 15A.
FIG. 15C is a side elevation view of the lower and inner portion of the intermediate connection of FIG. 15A.
FIG. 15D is a top view of the lower and inner portion of the intermediate connection of FIG. 15A.
FIG. 15E is a bottom view of the lower and inner portion of the intermediate connection of FIG. 15A.
FIG. 15F is an end view of the lower and inner portion of the intermediate connection of FIG. 15A.
Figure 16C:
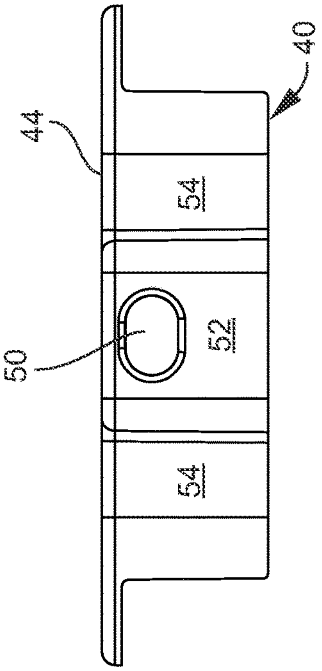
FIG. 16C is a side view of the upper and outer portion of the intermediate connection of FIG. 16A.
Figure 16D:
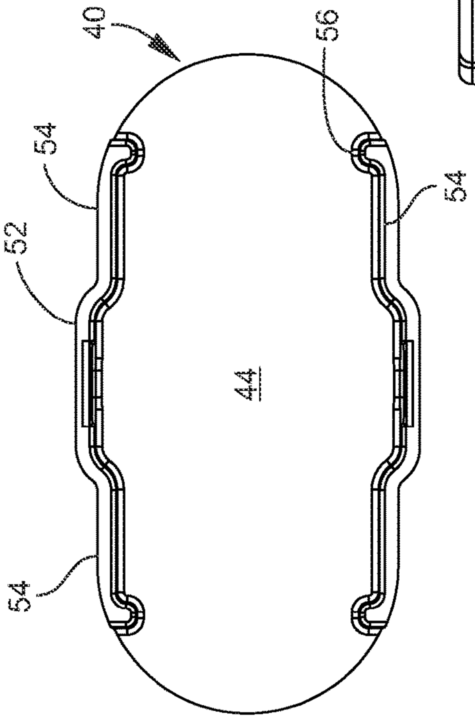
FIG. 16D is a bottom view of the upper and outer portion of the intermediate connection of FIG. 16A.
Figure 16E:
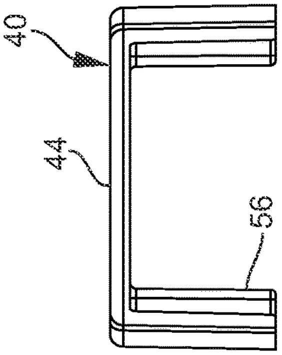
FIG. 16E is an end view of the upper and outer portion of the intermediate connection of FIG. 16A.
Figure 16A:
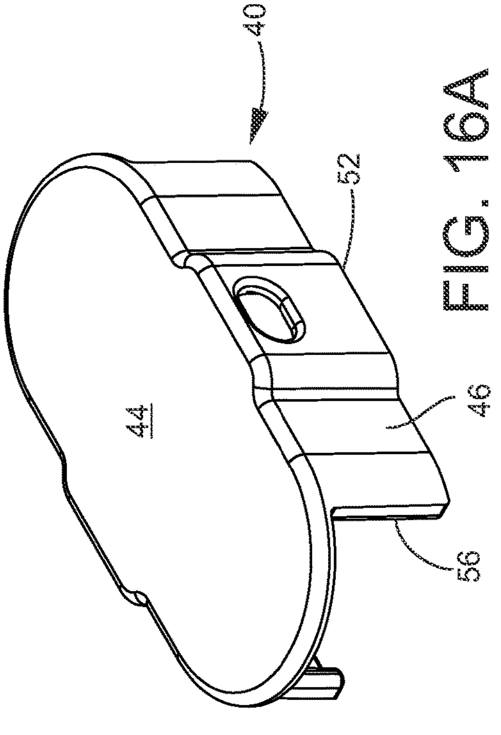
FIG. 16A is a top perspective view of the upper and outer portion of the intermediate connection of FIG. 13A.
Figure 16B:
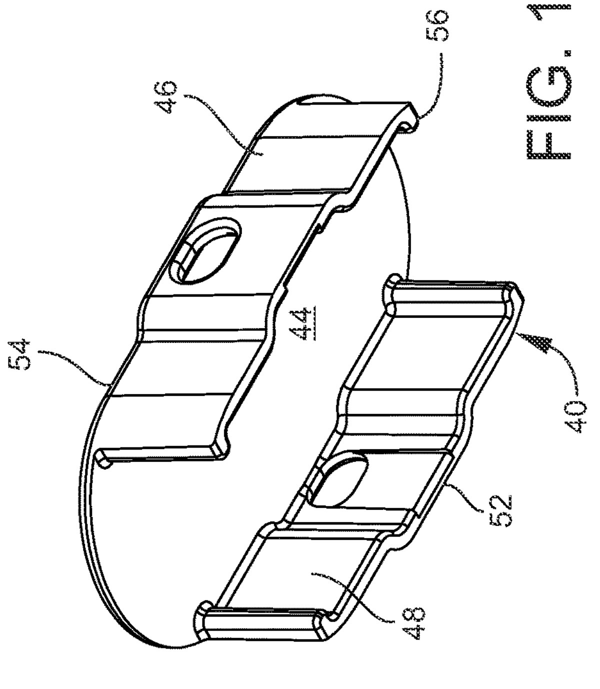
FIG. 16B is a bottom perspective view of the upper and outer portion of the intermediate connection of FIG. 16A.

Coil spring 150 continually biases the pivot hook 80 to the closed position shown in FIG. 12C. The pivot hook may pivot clockwise, as viewed from the front, as shown in FIG. 12A, until stop tab 149 makes contact with the portion of the front wall 186 designated as stop position 187 where the coil spring 150 is compressed. After finger or hand pressure is released upon the pivot hook 80, the pivot hook 80 returns automatically under the expansion of the coil spring 150 to a generally upright position, where stop tab 149 makes contact with closed stop position 189, which is a radially extending edge of the front wall 186. the portion of front wall 186, and where at substantially the same time, the pin shaft 84 of pin 78 is fully received in pin receiver 138. When the expansion is complete, the pivot hook 80 is at the position shown in FIGS. 10C and 12C.

The upper left connection 14 is shown in FIGS. 1, 2, 3, 4, 5A, 5B, 6A, 6B, and 6C. Upper left connection 14 includes a base 206, a U-shaped limiter 208, and a pin 210.

The base 206 includes a foundation 212 having an upper portion 214 and a lower portion 216. Upper portion 214 includes a pin hole 218. Lower portion 216 includes a pin hole 220. The rear side of the foundation 212 abuts a vertical surface such as a wall or door jamb of a house and screws or other pin connectors engage pin holes 218, 220 to fasten the base 206 to such a wall or door jamb or other vertical structure.

The base 206 further includes integral side extensions 222 extending laterally from the foundation 212 and in the same plane as the oblong shaped foundation 212. There are two side extensions 222, a first extension 222 extending from a left side of the foundation 212 and a second extension 222 extending from the right side of the foundation 212. Each of the side extensions 222 forms a channel 224 with a block 226.

Block 226 includes a vertical oriented pin receptor or socket 228 for a vertically oriented shaft portion 230 of pin 210. Block 226 includes a semi-circular or half-cylindrical portion 232 extending from a front of the block 226. Vertical oriented pin receptor 228 is formed by this half-cylindrical portion 232, with the opening of the vertically oriented pin receptor 228 being formed at the top of the half-cylindrical portion 232.

The channel 224 formed in block 226, and formed partially by side extensions 222, is a stepped or T-shaped channel 224. That is, stepped channel 224 includes a pair of relatively shallow grooves 234 separated by a relatively deep middle groove 236. Grooves 234, 236 run vertically. Stepped channel 224 includes an open top and an open bottom. Stepped channel 224 includes an upper barb receptor 238 and a lower barb receptor 240. Each of the upper and lower barb receptors 238, 240 is formed by a triangular cutout in each of the shallow grooves 234, with the depth of the cutout being greater than the innermost surface of the deep middle groove 236 such that the depth of the cutout is greater than the depth of the deep middle groove 236. Each of the triangular cutouts or barb receptors 238, 240 is defined by a horizontal edge or face 239 and an oblique edge or face 240. Each of the barb receptors 238, 240 is paired with another respective barb receptor 238, 240 adjacent to it, formed in the other shallow groove 234, and across from it, separated by the respective middle groove 236. Each of the barb receptors 238, 240 is paired with still another respective barb receptor 238, 240 on the other side of the block 226 and in the other channel 224. The upper barb receptors 238 are employed for a storage, nonoperating position of the limiter 208. The lower barb receptors 240 are utilized for an operating position for the limiter 208.

Block 226 includes side extensions 242 that extend outwardly from the half-cylinder projection 232. Side extensions 242 are disposed opposite of side extensions 222. Side extensions 222, 242 form channels 224.

A vertical axis of pin receptor 228 and half-cylinder 232 is disposed forwardly of the pair of channels 224 such that when limiter 208 is engaged by the base 206 the pin 210 and the gate frame 24 can swing at least ninety degrees to either side, depending upon how the gate apparatus 10 is set up. For such swinging, block 226 includes an upper face 244 that is flat and smooth when a proximal shaft end or horizontal unthreaded smooth shaft portion 246 rides on the upper face 244.

Pin 210 includes the vertical shaft portion 230 that is received in pin receptor 228, the proximal end or horizontal unthreaded smooth shaft portion 246, and a horizontal threaded shaft portion 248. Horizontal threaded shaft portion 248 engages a threaded nut 36 engaged to the outer end of horizontal support member 30 of second frame portion 28. Horizontal shaft portions 246, 248 are set at a right angle to vertical shaft portion 230 such that the shaft portions 246, 248 are set transversely relative to vertical shaft portion 230.

The U-shaped limiter 208 includes a ceiling or vertical limiter 250, a pair of legs or swinging limiters 252, and a stop wall 254. Each of the legs 252 includes opposing stepped inner faces 256 and a pair of opposing barbs 258.

Each of the stepped or T-shaped inner faces 256 includes a pair of relatively short straight spaced apart ridges 260 spaced apart by a relatively long middle straight ridge 262. Each of the ridges 260, 262 run vertically or parallel to the legs 252. Each of the barbs 258 extends further inwardly than does the long middle straight ridge 262 that extends further inwardly than does the short straight spaced apart ridges 260. Ridges 260, 262 run between the barbs 258 and a lower stop edge 264 of stop wall 254. The stepped or T-shaped inner faces 256 of the legs 252 provide rigidity to the legs 252 and minimize a snapping or breaking of the legs 252.

Each of the barbs 258 is triangular in section and include an upper horizontal face 266 and an oblique face 268. Each of the barbs 258 extend inwardly. Each of the oblique faces 268 extends upwardly and inwardly. The faces 266, 268 form a knife like edge as a junction.

The stop wall 254 and ceiling portion 250 form a mount or support or base for the legs 252. Stop wall 254 extends between the legs 252. Ceiling portion 250 extends between the legs 252. Stop wall 254 extends from the ceiling portion 250 to the lower edge 264. Stop wall 254 is shaped in the form of a plate. Ceiling portion 250 extends forwardly of the stop wall 254 and further extends forwardly of the axis of pin receptor 228 such that when an attempt is made to remove pin 210 from pin receptor 228 the ceiling portion 250 frustrates such an effort when a pin shaft junction 270 or when proximal pin end 246 hits the front underside of the ceiling portion 250. This is how the ceiling portion 250 works as a vertical limiter for the pin 210. This limiting action occurs when barbs 258 are engaged in the operating lower position defined by barb receptors 240. This limiting action does not occur when barbs 258 are engaged in the storage upper position defined by barb receptors 238.

When the barbs 258 are in the upper barb receptors 238, the limiter 208 is in a storage position. Limiter 208 is less likely to be lost by the end user. In this storage position the lower edge 264 of stop wall is spaced from the upper face 244 of block 226. In this storage position, short and long ridges 260, 262 are engaged respectively by shallow and deep grooves 234 and 236. When limiter 208 is in this storage position, pin 210 can be freely inserted into and removed from pin receptor 228. When limiter 208 is in this storage position, the stop wall 254 is sufficiently low so as to act as a guide or stop for vertical shaft portion 230 as an end user attempts to insert the vertical shaft portion in the pin receptor 228.

When the barbs 258 are in the lower barb receptors 240, the limiter 208 is in an operating position. That is, pin 210 cannot be freely removed from the base 206 and the gate frame 24 cannot be freely removed from the left connections 14, 16. In this operating position, pin 210 and gate frame 24 can be raised such that head 86 of pin 78 of the upper right connection 12 can be removed from socket 168 such that upper right connection 12 can be opened or disengaged and such that lower right connection 18 can be opened or disengaged. In this operating position, pin 210 can swing freely to one side or to the other side for ninety degrees depending upon how gate apparatus 10 has been set up. In this operating position, the lower edge 254 abuts the upper face 244 of block 226.

On its rear side, limiter 208 includes a pair of vertical edges 272 that are coplanar with a rear face of foundation 212 of base 206. On its rear side, limiter 208 further includes a pair of horizontal edges 273 that are coplanar with lower edge 264 of stop wall 254. These horizontal edges 273 abut upper ends of side extensions 222 when the limiter 208 is in the operating position where the barbs 258 are engaged by the lower barb receptors 240. Horizontal edges 273 and stop edge 264 abut their respective portions of base 206 when barbs 258 are engaged by the lower barb receptors 240 and further prevent a further downward movement by legs 252 and limiter 208 as a whole.

Legs 252 are resiliently expandable outwardly away from each other. Limiter 208 is integral and one-piece. Base 206 is integral and one-piece.

Legs 252 include distal end portions 274 disposed distally of barbs 259. These distal end portions 274 extend beyond the lower barb receptors 240 and further extend beyond a lower horizontal face 276 of block 226 when barbs 258 are engaged in the lower barb receptors 240 so as to provide an end user with free distal ends 274 that the end user may resiliently draw apart to disengage the barbs from the lower barb receptors 240 and so as to slide the legs 252 upwardly relative to the base 206 to the upper barb receptors 238. It is then problematic to slide the legs 252 further upwardly out of the upper barb receptors 238 because the width of the each of the legs 252 is equal to or about equal to the depth of each of the channels 224. That is, side extensions 222 and 242 have end faces that are coplanar with each other and that are further coplanar with the outside faces of legs 252 when barbs 258 are in either of the upper or lower barb receptors 238, 240.

Distal end portions 274 of legs 252 are accessible when barbs 258 are in the lower barb receptors 240. Distal end portions 274 are accessible when the limiter 208 is being raised from the lower bar receptors 240 to the upper barb receptors 238 since the barbs 258 are riding on the shallow grooves 234. Distal end portions 274 suddenly become relatively inaccessible when the barbs 258 pop or snap into the upper barb receptors 238 so as to maximize the chance that the limiter 208 will stay on the base 206 and so as to maximize the chance that the limiter 208 will not be lost by the end user.

Limiter 208 can be slid easily from the upper barb receptor position to the lower barb receptor position because of the orientation of the respective oblique faces 241, 268 of the upper barb receptors 238 and barbs 258 that automatically force an outward resilient expansion on the part of the legs 252. Limiter 298 can be slid easily from the lower barb receptor position to the upper bar receptor position because of distal end portions 274 of the legs 252 are readily available to the end user to grasp and pull apart until the respective horizontal faces 239, 266 of the lower barb receptor 240 and barbs 258 are disengaged laterally of each other.

Ceiling portion 150 forms an arch between legs 252. Ceiling portion 150 includes a front edge that extends forwardly and undulates from one side or one leg 252 to the other side or the other leg 252 to generally follow the shape of the front side of block 226 that includes the half-cylinder projection 232.

Lower left connection 16 includes a base 278 and a pin 280. Base 278 includes an oblong shaped foundation 282 having an upper portion 284 and a lower portion 286. Upper portion 284 includes a pin receiver 288 and lower portion 286 includes a pin receiver 290. The rear side of the foundation 282 abuts a vertical surface such as a wall or door jamb of a house and screws or other pin connectors engage pin receivers 288, 290 to fasten the base 278 to such a wall or door jamb or other vertical structure. Base 278 includes a block 292 extending forwardly from the foundation 282. Block 292 and foundation 282 are integral and one-piece. Block 292 and foundation 282 of lower left connection 16 are shaped similarly to block 226 and foundation 212 of upper left connection 14, except that block 292 does not have channels 224 and side extensions 222 and 242. Block 292 includes a forwardly projecting vertically oriented half cylinder 294 that forms a socket or vertically oriented pin receptor 296 for reception of a vertically oriented pin shaft portion 298. Block 292 includes an upper flat and smooth surface 300 that permits the pin 280 to pivot horizontally ninety degrees in either direction depending upon how the gate apparatus 10 is set up, i.e., depending upon which way the gate frame 24 is permitted to swing. The distance from the rear side of foundation 282 to the axis of pin receptor 296 in base 278 is identical to the distance from the rear side of foundation 212 of base 206 to the axis of pin receptor 228 of base 206 such that the vertical pin shaft portions 298, 230 of respective pins 280, 210 are coaxial when secured to the same vertical surface and a vertically aligned with each other. Pin shaft portion 298 swings freely with minimal wobble in pin receptor 296, just like pin shaft portion 230 of pin 210 swings freely with minimal wobble in pin receptor 228 of base 206, such that gate frame 24 swings freely with minimal wobble when disengaged from upper right connection 12 and lower right connection 18. The length of vertical pin shaft portion 298 is the same length as vertical pin shaft portion 230 of pin 210 such that pin shaft portion 298 remains in pin receptor 296 when pin 210 hits the limiting ceiling portion 250 of limiter 208 when limiter 208 is in the lower barb position and such that pin shaft portion 298 is removable from pin receptor 296 when limiter 208 is in the upper barb position whereby gate frame 24 can be removable from the upper and lower left side connections 14, 16. Along with vertical straight pin shaft portion 298, pin 280 includes a transition or pin shaft junction 302, a proximal pin shaft portion or horizontally extending straight smooth pin shaft portion 304, and a distal pin shaft portion or horizontally extending straight threaded pin shaft portion 306. Threaded pin shaft portion 306 is engaged with a threaded nut 36 engaged to the outer end of lower support member 32 of second frame portion 28. Smooth pin shaft portion 304 rides on the upper surface 300 of block 292. Horizontal pin shaft portions 304, 306 are set at a right angle to vertical pin shaft portion 298 such that horizontal pin shaft portions 304, 306 are set transversely relative to vertical pin shaft portion 298.

Lower right connection is shown in FIGS. 1, 2, 3, and 8A. Lower right connection 18 includes a base 308 and a pin 310. Pin 310 includes a straight threaded shaft 312, a head 314 shaped in the form of a disk, and a threaded nut 316 that is turnable to travel axially along the threaded shaft 312 from a location just short of the proximal end having the head 314 to the free distal end 318. Shaft 312 is threaded from just short of the head 314 to distal end 318. The portion of the pin shaft 310 that is smooth and unthreaded is shaft pin portion 319 that is immediately adjacent to the inner face of head 314. Pin 310 is threadable into and out of a nut 36 that is engaged to the outer end of lower support member 32 of first frame portion 26, and nut 316 sets or locks in pin 310 such that head 314 is at a custom, end user defined distance from the outer end of lower support member 32 of first frame portion 26. Base 308 includes an oblong shaped backing or foundation 320 having an upper end portion 322 and a lower end portion 324. Upper end portion 322 includes a pin receiver 326 and lower end portion 324 includes a pin receiver 328. Pin receivers 326, 328 receive pins such as screws for connecting base 308 to the vertical surface to which base 82 of upper right connection 12 is engaged and in a manner vertically aligned with base 82. Backing 320 has a front wall 330 that is smooth and flat and is disposed underneath pin receiver 326 and above a socket housing 332.

Socket housing 332 is integral and one piece with backing 320. Socket housing 332 includes a pair of opposing sidewalls 334 and a front wall 336 disposed between the sidewalls 334. Socket housing 332 further includes a lower circular wall 338 connecting the sidewalls 334. Front wall 336 depends to the lower circular wall 338. Front wall 336 includes an upper circular edge 340 that includes a semi-circular cutout 342 disposed in the middle of the upper circular edge 340. Circular cutout 342 receives the smooth unthreaded pin shaft portion 319 of pin 310. Front wall 330 of backing 320 includes a lower edge having a semi-circular tab 344 disposed adjacent to and spaced apart from semi-circular cutout 342. Socket housing 332 further includes a circular floor 346 depending from the upper ends of socket housing sides 334. Socket housing 332 includes a socket 348. Socket 348 is formed by sides 334, front wall 336, the lower edge of front wall 330 including semi-circular tab 344, the lower circular wall 346, and the upper edge 340 and semi-circular cutout 342. Socket 348 receives the head 314 of pin 310. Pin head 314 is liftable out of socket 348 when pivot hook 80 is swung to an out-of-the-way position and head 86 of pin 78 is lifted out of socket 168. Front wall 330 and semi-circular tab 344 act as a guide for the outer face of pin head 314 as the head 314 is brought into engagement with socket 348. When pin 310 is engaged in socket 348, the circular edge of head 314 can engage the lower circular floor 346 and the smooth pin shaft portion 319 can engage the semi-circular cutout 342.

In operation, to set up the gate apparatus 10, such as from the to-be-assembled state shown in FIG. 3, the width of the passageway is measured such as with a tape measure or simply by taking the individual first and second gate frame portions 26, 28, not yet engaged, and holding them end to end to determine how much the inner ends of the gate frame portions 26, 28 will be overlapped relative to each other. In the case discussed here, the innermost vertical support member 350 of first gate frame portion 26 is to be adjacent the second-to-innermost vertical support member 352 of the second gate frame portion 28 and the innermost vertical support member 354 of second gate frame portion 28 is to be adjacent the second-to-innermost vertical support member 356 of first gate frame portion 26. In other words, vertical support members 350, 352 are to be in the same lateral and vertical plane and vertical support members 354, 356 are to be in the same lateral and vertical plane when gate apparatus 10 is operational. Then, after it is determined how much of first and second gate frame portions 26, 28 will overlap and the end user laterally aligns support members 350, 352 with each other by hand and vertical support members 354, 356 with each other by hand, intermediate connectors 20, 22 are engaged to the first and second gate frame portions 26, 28. This is done by inserting the inner portion 42 between the aligned pair 350, 352 and the aligned pair 354, 356 by pushing inner portion 42 of each of the intermediate connectors 20, 22 into a friction fit with horizontal support members 30, 30 of the first and second gate frame portions 26, 28, which horizontal support members are aligned so as to be in the same horizontal and lateral planes. In other words, the width between opposing end sidewalls 64 is slightly less than or equal to the width of the combination of the widths of the two horizontal support members 30, 30 of first and second frame portions 26, 28. Further, the length between the deepest most sections of longitudinally opposing notches 72 are slightly less than or equal to the length between any two vertical support members 34 that are adjacent to each other, namely, the length between the surfaces of such vertical support members 34 that are closest to each other. The friction fit of the inner portion 42 is thus derived laterally from the lateral fit between the opposing end sidewalls 64 and longitudinally from the longitudinal fit between longitudinally opposed notches 72. The inside height of the opposing end sidewalls 64, determined from an upper face of network 76, upon which the lower face of the horizontal support members 30 lie, is about equal to the side faces of the horizontal support members 30, 30. Then, after the inner portion 42 of each of the intermediate connectors 20, 22 has been engaged to the first and second frame portions 26, 28, the outer portion 40 of each of the intermediate connectors 20, 22 is snapped onto its respective inner portion 42. In case of the upper intermediate connector the outer portion 40 is pressed down upon its respective inner portion 42. In the case of the lower intermediate connector 20, the outer portion 40 is pressed up against its respective inner portion 42 until the opposing tabs 68 snap into their respective opposing openings 50. The outer face of tab 68 is inclined or ramped or oblique to facilitate the snap on action of tab 68 into a respective opening 50. Opening 50 includes a reinforced perimeter and the tab retainer 70 engages such reinforced perimeter without extending beyond a plane defined by the outer surface of sidewall portion or step 52. Reinforced perimeter of opening 50 may be defined as an integral bead or radius. When connector portions 40, 42 are engaged, it can be seen from FIG. 14C that the height of steps 52, 54, as measured from the inside face of ceiling 44 to the free ends of steps 52, 54, is about the same as the height of outer faces of sidewall portions 64, 66 of inner connector portion 42. When the intermediate connectors 20, 22 are engaged to and between the first and second frame portions 26, 28 to form gate frame 24, the first and second frame portions 26, 28 act as a one-piece frame with minimal lateral, longitudinal, and height-wise movement relative to each other.

Then, to continue the set up operation, it is determined which way the gate frame 24 will swing. A swinging of gate frame 24, after set up and without lifting the gate frame 24, will be stopped by bases 82, 308. Such a stop of the swinging action will occur by the heads 86, 314 of respective pins 78, 310 hitting sides of bases 82, 308, namely, the sides of socket housings 176, 332 of respective bases 82, 308. Thus, bases 82, 308 are engaged to the same preferred vertical surface defining the passageway and bases 206, 278 are engaged to the opposing vertical surface of the passageway. A swinging of gate frame 24, after set up and with a lifting of gate frame 24 to the height shown in FIG. 5B where pin 210 hits the underside of ceiling 250, will bring the pin shaft portion 84 into contact with segment 116 of pivot hook 80, which contact will pivot the pivot hook 80 so as to capture the pin shaft portion 84 with the pin receiver 138, which pivoting is stopped by a compression of spring 150 and does not permit the gate frame 24 to swing through.

Bases 82, 308, 206, 278 can be engaged to their respective vertical surface locations one by one. For example, lower left connection 278 can be set up at a generally determined height and location. Then pin 280 is turned into its respective nut 36 to the end user defined distance at the outer end of lower horizontal support member 32 of second gate frame portion 28. Then the other end of pin 280 can be engaged to base 278. The strength of base 278, just like the separate strength of each of the individual bases 206, 82, 308, is more than sufficient to on its own hold the full weight of the gate frame 24. Then pin 210 is threaded into nut 36 of the outer end 30 of upper horizontal support member 30 of second gate frame portion 28 so as to leave exposed the same amount of horizontal distance on each of the pins 210, 280, i.e., the end user defined distance that may change from end user to end user. From pin 210 and holding the gate frame 24 in a vertical plane, it can be determined with specificity the location to secure base 206 to the vertical surface. Then the other end of pin 210 is deposited into the now secured base 206 by lifting and lowering gate frame 24 such that pins 280, 210 are deposited into their respective bases 278, 206 at the same time. Then limiter 208 may be slid onto base 206 to the lower barb position. With the left hand swing side bases 206, 278 now secured to one vertical surface, it can be determined with specificity where the other two latch side bases 82, 308 on the opposing vertical surface are to be secured and then such two bases 82, 308 are engaged to such vertical surface. Then each of the pins 78, 310 is turned incrementally into or out of their respective nuts 36 until their respective heads 86, 314 align longitudinally with their respective sockets 168, 348, whereupon the nuts 88, 316 that may or may not be locking nuts, are turned until the nuts 88, 316 engage the outer surfaces of the respective upper and lower nuts 36 of the respective upper and lower outer ends of the respective upper and lower support members 30, 32 of the first frame portion 26.

In operation, to open the gate frame 24, the pivot hook 80 is swung to the out-of-the-way position shown in FIG. 12A, and the gate frame 24 is lifted such that heads 86, 314 clear their respective sockets 168, 348. Then the gate frame 24, with pivot hook 80 swung out of the way, is swung away from pivot hook 80 and bases 82, 308 so as to open the passageway. Gate frame 24 may be swung to a position parallel to the vertical surface to which bases 206, 278 are engaged or to a position slightly beyond such parallel position such that gate frame 24 may be obliquely positioned to such vertical surface such that the heads 86, 314 touch such vertical wall or one or more of the limiter 208 or bases 206, 278 may be configured to act as stops against pins 210, 280 before the heads 86, 314 touch such vertical surface. For example, the legs 252 can have a sufficient longitudinal length to act as a stop. After the gate frame 24 has been swung away from the pivot hook 80 and the pivot hook 80 is released by the end user, the pivot hook 80 automatically returns to its closed position, as shown in phantom in FIG. 12A, by an expansion of the coil spring 150.

In operation, to close the gate frame 24 is lifted and then the gate frame 24 is swung to the pivot hook 80 without the end user himself or herself pivoting the pivot hook 80, whereupon the head 86 of pin 78 hits segment 116 of the pivot hook 80, whereupon the pivot hook 80 automatically swings, whereupon the threaded portion 84 is captured by the pin receiver 138 of the pivot hook 80, whereupon the gate 24 may be released to permit the heads 86, 314 of pins 78, 310 to drop into their respective sockets 168, 348, and whereupon the pivot hook 80 automatically swings back to its closed position. If the gate frame 24 is not lifted and then the gate frame 24 is swung toward the bases 82, 308, the heads 86, 314 hit the sides of the respective bases 82, 308 to stop such swinging without an engagement of the heads 86, 314 in their respective sockets 168, 348.

In operation, when the gate frame 24 is closed, the upright support members 34 and horizontal support members 32 minimize the passage of infants, toddlers, small children, and pets such as cats and dogs through, under, or over the gate frame 24.

In operation, to remove the gate frame 24 from the bases 82, 206, 278, 308, the limiter 208 is moved to the upper barb position such that pin 210 is not inhibited by the underside of the ceiling 250 and such that pins 210 280 can be lifted free of their respective bases 206, 278. Before, during, or after this step of sliding up the limiter 208 to the upper barb position, the pivot hook 80 can be pivoted so as to free pin 78 and so as to allow pins 78 and 310 to be disengaged from their respective bases 82, 308. Gate frame 24 once free of its respective bases 82, 206, 278 and 308 can be stored as one piece or as two separate pieces if connectors 20, 22 are disengaged by squeezing in tabs 68 of intermediate sidewalls or steps 66, which are spaced from the side faces of horizontal support members 30, 30, and then drawing portions 40, 42 apart. The intermediate connections 20, 22 are engagable to and disengageable from the first and second gate frame portions 26, 28 without destroying the integrity of the first and second gate frame portions 26, 28 and the intermediate connections 20, 22. Bases 82, 206, 278, 308 may then be left engaged unobtrusively to the vertical surfaces to which they are secured or such bases may be removed from their respective vertical surfaces.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A gated barrier for engagement between first and second surfaces, comprising:

a) a gate frame having a first gate frame portion and a second gate frame portion, each of the first and second gate frame portions having upper and lower support members, each of the first and second gate frame portions having traversing support members traversing a distance between the upper and lower support members to tie together the upper and lower support members, the first and second gate frame portions being in adjacent parallel planes;

b) a first connection including a first base that is configured to be engaged to the first surface, the first connection engaging the first gate frame portion, the first gate frame portion being liftable from said first base;

c) a second connection including a second base that is configured to be engaged to the first surface below the first base, the second connection engaging the first gate frame portion, the first gate frame portion being liftable from said second base;

d) a third connection including a third base that is configured to be engaged to the second surface, the third connection engaging the second gate frame portion, the second gate frame portion being liftable from said third base;

e) a fourth connection including a fourth base that is configured to be engaged to the second surface below the third base, the fourth connection engaging the second gate frame portion, the second gate frame portion being liftable from said fourth base;

f) the first connection and the second connection having respective first and second pins that are engaged to the first gate frame portion and movable horizontally in a longitudinal direction such that the first and second pins are movable to and away from the first surface;

g) the third connection and the fourth connection having respective third and fourth pins that are engaged to respective sockets in the third and fourth bases, each of the third and fourth pins including a vertical shaft portion;

h) an intermediate connection fixing the first and second gate frame portions relative to each other to minimize lateral and longitudinal movement of the first and second gate frame portions relative to each other, the intermediate connection being engagable to and disengageable from the first and second gate frame portions without destroying the integrity of the first and second gate frame portions and the intermediate connection;

i) wherein the intermediate connection includes an outer piece and an inner piece that are engagable to and disengagable from each other;

j) the intermediate connection being abuttable against a first traversing support member of the first gate portion and, at a same time, being abuttable against a first traversing support member of the second gate portion;

k) the intermediate connection abutting at the same time outer side faces, top faces, and bottom faces of said upper support members of the first and second gate portions;

l) the first traversing support members of the first and second gate portions defining a vertical plane; and m) the intermediate connection including first and second extensions that separate the first and second gate frame portions from each other, the first and second extensions being longitudinally opposed, the first and second extensions extending into a space between the first and second gate frame portions.

2. A gated barrier for engagement between first and second surfaces, comprising:

a) a gate frame having a first gate frame portion and a second gate frame portion, each of the first and second gate frame portions having upper and lower support members, each of the first and second gate frame portions having traversing support members traversing a distance between the upper and lower support members to tie together the upper and lower support members;

b) a first connection including a first base that is configured to be engaged to the first surface, the first connection engaging the first gate frame portion, the first connection being an upper connection, the first base being an upper base;

c) a second connection including a second base that is configured to be engaged to the first surface below the first base, the second connection engaging the first gate frame portion, the second connection being a lower connection, the second base being a lower base;

d) a third connection including a third base that is configured to be engaged to the second surface, the third connection engaging the second gate frame portion, the third connection being an upper connection, the third base being an upper base;

e) a fourth connection including a fourth base that is configured to be engaged to the second surface below the third base, the fourth connection engaging the second gate frame portion, the fourth connection being a lower connection, the fourth base being a lower base;

f) wherein the first gate frame portion is liftable from said first base and said second base, and wherein the second gate frame portion is liftable from said third base and said fourth base;

g) an intermediate connection fixing the first and second gate frame portions relative to each other to minimize lateral and longitudinal movement of the first and second gate frame portions relative to each other, the intermediate connection being engagable to and disengageable from the first and second gate frame portions without destroying the integrity of the first and second gate frame portions and the intermediate connection;

h) the intermediate connection having a width about equal to a lateral distance between outer side faces of upper support members of the first and second gate frame portions that are laterally aligned such that the intermediate connection minimizes lateral movement of the first and second gate frame portions relative to each other;

i) the intermediate connection being abuttable at a same time against a first traversing support member of the first gate portion and a first traversing support member of the second gate portion such that the intermediate connection minimizes longitudinal movement of the first and second gate frame portions relative to each other;

j) wherein said first traversing support member of the first gate frame portion is disposed in a common lateral plane with said first traversing support member of the second gate frame portion, wherein a second traversing support member of the second gate frame portion is disposed in a common lateral plane with a second traversing support member of the second gate frame portion, wherein the upper support members of the first and second gate frame portions are disposed in a common horizontal plane, and wherein the lower support members of the first and second gate frame portions are disposed in a common horizontal plane;

k) the intermediate connection including an outer piece and an inner piece that are engagable to and disengagable from each other;

l) the intermediate connection engaging laterally adjacent sections of the first and second gate frame portions, with such laterally adjacent sections being on one of a) the upper support members and b) the lower support members;

m) the outer piece of the intermediate connection being adjacent to outer side faces and top faces of said upper support members of the first and second gate portions; and n) the inner piece of the intermediate connection being adjacent to outer side faces and bottom faces of said upper support members of the first and second gate portions.

3. The gated barrier of claim 2, wherein the intermediate connection includes first and second extensions that separate the first and second gate frame portions from each other, the first and second extensions being longitudinally opposed, the first and second extensions extending into a space between the first and second gate frame portions.

* * * * *